US011160030B2

(12) United States Patent
Abedini et al.

(10) Patent No.: US 11,160,030 B2
(45) Date of Patent: Oct. 26, 2021

(54) POWER CONTROL IN DIRECTIONAL BEAM ENVIRONMENTS

(71) Applicant: QUALCOMM Incorporated, San Diego, CA (US)

(72) Inventors: Navid Abedini, Somerset, NJ (US); Xiao Feng Wang, San Diego, CA (US); Bilal Sadiq, Basking Ridge, NJ (US); Sundar Subramanian, San Diego, CA (US); Muhammad Nazmul Islam, Edison, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/178,527

(22) Filed: Nov. 1, 2018

(65) Prior Publication Data

US 2019/0141640 A1    May 9, 2019

Related U.S. Application Data

(60) Provisional application No. 62/581,538, filed on Nov. 3, 2017.

(51) Int. Cl.
*H04W 24/10*     (2009.01)
*H04W 52/42*     (2009.01)
(Continued)

(52) U.S. Cl.
CPC ....... *H04W 52/146* (2013.01); *H04W 52/365* (2013.01); *H04W 52/42* (2013.01); *H04W 24/10* (2013.01); *H04W 88/02* (2013.01)

(58) Field of Classification Search
CPC . H04W 52/146; H04W 52/365; H04W 52/42; H04W 24/10; H04W 88/02; H04W 52/36; H04W 52/14
See application file for complete search history.

(56) References Cited

U.S. PATENT DOCUMENTS

| 2013/0208675 A1* | 8/2013 | Shen | H04W 52/367 370/329 |
| 2017/0195998 A1* | 7/2017 | Zhang | H04B 7/086 |

(Continued)

OTHER PUBLICATIONS

NPL-1 Huawei,Consideration on PHR with multi-beam operation Aug. 2017 (Year: 2017).*

(Continued)

*Primary Examiner* — Dong-Chang Shiue
(74) *Attorney, Agent, or Firm* — Qualcomm Incorporated

(57) ABSTRACT

Techniques are provided for power control in directional beam environments. A user equipment (UE) may determine one or more power parameters on a beam-by-beam basis. Each directional uplink transmission beam in a communication link between the UE and the base station may be independently controlled using these beam-specific power parameters. Examples of these beam-specific power parameters may include a maximum output power for a given directional uplink transmission beam and a difference between the maximum output power for the given directional uplink transmission beam and an estimated transmit power for the given directional uplink transmission beam. The UE may report one or more of these beam-specific power parameters to a base station using a beam-specific report.

24 Claims, 15 Drawing Sheets

(51) Int. Cl.
*H04W 52/14* (2009.01)
*H04W 52/36* (2009.01)
*H04W 88/02* (2009.01)

(56) References Cited

U.S. PATENT DOCUMENTS

2018/0115957 A1* 4/2018 Lin .................. H04W 52/42
2018/0324715 A1* 11/2018 Ryoo ................ H04W 52/365
2018/0368081 A1* 12/2018 Akkarakaran ...... H04W 52/242

OTHER PUBLICATIONS

NPL-2 Extended PHR considering beam and TRxP change Oct. 2017 (Year: 2017).*
NPL-3 On NR PHR calculation Aug. 2017 (Year: 2017).*
"Extended PHR Considering Beam and TRxP Change," 3GPP Draft; R2-1711801 Extended PHR Considering Beam and TRxP Change, 3rd Generation Partnership Project (3GPP), Mobile Competence Centre; 650, Route Des Lucioles; F-06921 Sophia-Antipolis Cedex; F, vol. RAN WG2, No. Prague, Czech Republic; Oct. 9, 2017-Oct. 13, 2017, Oct. 8, 2017, XP051343757, 5 pages, Retrieved from the Internet: URL: http://www.3gpp.org/ftp/Meetings_3GPP_SYNC/RAN2/Docs/ [retrieved on Oct. 8, 2017].
Huawei, et al., "Consideration on PHR with Multi-beam Operation," 3GPP Draft; R2-1709266 Consideration on PHR with Multiple Beams Operation, 3rd Generation Partnership Project (3GPP), Mobile Competence Centre; 650, Route Des Lucioles; F-06921 Sophia-Antipolis Cedex, vol. RAN WG2, No. Berlin, Germany; Aug. 21, 2017-Aug. 25, 2017, Aug. 20, 2017, XP051319030, 5 pages, Retrieved from the Internet: URL: http://www.3gpp.org/ftp/Meetings_3GPP_SYNC/RAN2/Docs/ [retrieved on Aug. 20, 2017].
International Search Report and Written Opinion—PCT/US2018/058940—ISA/EPO—dated Jan. 25, 2019.
ZTE: "On NR PHR Calculation," 3GPP Draft; R1-1712313 on NR PHR Calculation, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 21, 2017-Aug. 25, 2017, Aug. 20, 2017, XP051315129, 6 pages, Retrieved from the Internet: URL: http://www.3gpp.org/ftp/Meetings_3GPP_SYNC/RAN1/Docs/ [retrieved on Aug. 20, 2017].

* cited by examiner

POWER CONTROL IN DIRECTIONAL BEAM ENVIRONMENTS

CROSS REFERENCES

The present Application for patent claims the benefit of U.S. Provisional Patent Application No. 62/581,538 by ABEDINI, et al., entitled "POWER CONTROL IN DIRECTIONAL BEAM ENVIRONMENTS," filed Nov. 3, 2017, assigned to the assignee hereof, and expressly incorporated herein.

BACKGROUND

The following relates generally to wireless communication and to power control in directional beam environments.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support power control in directional beam environments. Generally, the described techniques provide for determining one or more power parameters on a beam-by-beam basis. Each directional uplink transmission beam in a communication link between a user equipment (UE) and a base station may be independently controlled using these beam-specific power parameters. Examples of these beam-specific power parameters may include a maximum output power for a given directional uplink transmission beam and a difference between the maximum output power for the given directional uplink transmission beam and an estimated transmit power for the given directional uplink transmission beam. The UE may report one or more of these beam-specific power parameters to a base station using a beam-specific report.

A method of wireless communication is described. The method may include identifying a beam-specific parameter indicating a maximum transmit power for a directional uplink beam of a UE, generating a beam-specific report that includes the beam-specific parameter, and transmitting the beam-specific report using the directional uplink beam.

An apparatus for wireless communication is described. The apparatus may include means for identifying a beam-specific parameter indicating a maximum transmit power for a directional uplink beam of a UE, means for generating a beam-specific report that includes the beam-specific parameter, and means for transmitting the beam-specific report using the directional uplink beam.

Another apparatus for wireless communication is described. The apparatus may include a processor, memory in electronic communication with the processor, and instructions stored in the memory. The instructions may be operable to cause the processor to identify a beam-specific parameter indicating a maximum transmit power for a directional uplink beam of a UE, generate a beam-specific report that includes the beam-specific parameter, and transmit the beam-specific report using the directional uplink beam.

A non-transitory computer-readable medium for wireless communication is described. The non-transitory computer-readable medium may include instructions operable to cause a processor to identify a beam-specific parameter indicating a maximum transmit power for a directional uplink beam of a UE, generate a beam-specific report that includes the beam-specific parameter, and transmit the beam-specific report using the directional uplink beam.

Some examples of the method, apparatus, and non-transitory computer-readable medium described above may further include processes, features, means, or instructions for identifying a second beam-specific parameter for a second directional uplink beam of the UE. Some examples of the method, apparatus, and non-transitory computer-readable medium described above may further include processes, features, means, or instructions for transmitting the beam-specific report with the second beam-specific parameter and the beam-specific parameter using the directional uplink beam.

Some examples of the method, apparatus, and non-transitory computer-readable medium described above may further include processes, features, means, or instructions for identifying a maximum transmit power for the second directional uplink beam, wherein the second beam-specific parameter indicates the identified maximum transmit power for the second directional uplink beam.

Some examples of the method, apparatus, and non-transitory computer-readable medium described above may further include processes, features, means, or instructions for identifying a difference between a maximum transmit power for the second directional uplink beam and an estimated transmit power for the second directional uplink beam, wherein the second beam-specific parameter indicates the identified difference.

Some examples of the method, apparatus, and non-transitory computer-readable medium described above may further include processes, features, means, or instructions for generating a bit-map that associates a first set of data elements of the beam-specific report with the beam-specific parameter and a second set of data elements of the beam-specific report with the second beam-specific parameter.

Some examples of the method, apparatus, and non-transitory computer-readable medium described above may further include processes, features, means, or instructions for generating a second beam-specific report that includes a second beam-specific parameter for a second directional uplink beam. Some examples of the method, apparatus, and non-transitory computer-readable medium described above may further include processes, features, means, or instructions for transmitting the second beam-specific report using the directional uplink beam or the second directional uplink beam.

In some examples of the method, apparatus, and non-transitory computer-readable medium described above, the second beam-specific report may be transmitted using a medium access control (MAC) control element (CE) carried on a physical uplink shared channel (PUSCH) or uplink control information (UCI) carried on a physical uplink control channel (PUCCH) or a combination thereof.

In some examples of the method, apparatus, and non-transitory computer-readable medium described above, the beam-specific report may be transmitted using a MAC CE carried on a PUSCH on the first directional uplink beam or UCI carried on a PUCCH on the first direction uplink beam or a combination thereof.

Some examples of the method, apparatus, and non-transitory computer-readable medium described above may further include processes, features, means, or instructions for identifying a trigger event associated with the directional uplink beam, wherein generating the beam-specific report may be based at least in part on identifying the trigger event.

In some examples of the method, apparatus, and non-transitory computer-readable medium described above, the trigger event comprises at least one of an establishment of a second directional uplink beam with a base station, or a determination that a signal quality parameter associated with the directional uplink beam satisfies a threshold, or a determination that a timer associated with the directional uplink beam may have expired, or receipt of a message requesting receipt of the beam-specific report, or a combination thereof.

Some examples of the method, apparatus, and non-transitory computer-readable medium described above may further include processes, features, means, or instructions for identifying a second beam-specific parameter for the directional uplink beam, the second beam-specific parameter indicating a difference between the maximum transmit power and an estimated transmit power for the directional uplink beam, wherein the beam-specific report includes the second beam-specific parameter.

In some examples of the method, apparatus, and non-transitory computer-readable medium described above, the beam-specific parameter may be a PCMAX parameter. In some examples of the method, apparatus, and non-transitory computer-readable medium described above, the second beam-specific parameter may be a power headroom parameter.

In some examples of the method, apparatus, and non-transitory computer-readable medium described above, the beam-specific report may be a power headroom report that includes power information for a plurality of directional uplink beams associated with the UE.

A method of wireless communication is described. The method may include receiving a beam-specific report using a directional uplink beam transmitted by a UE, identifying a beam-specific parameter indicating a maximum transmit power for the directional uplink beam based at least in part on receiving the beam-specific report, determining one or more uplink communication resources for the UE based at least in part on the beam-specific parameter, and transmitting a message indicating a resource grant to the UE based at least in part on the one or more uplink communication resources.

An apparatus for wireless communication is described. The apparatus may include means for receiving a beam-specific report using a directional uplink beam transmitted by a UE, means for identifying a beam-specific parameter indicating a maximum transmit power for the directional uplink beam based at least in part on receiving the beam-specific report, means for determining one or more uplink communication resources for the UE based at least in part on the beam-specific parameter, and means for transmitting a message indicating a resource grant to the UE based at least in part on the one or more uplink communication resources.

Another apparatus for wireless communication is described. The apparatus may include a processor, memory in electronic communication with the processor, and instructions stored in the memory. The instructions may be operable to cause the processor to receive a beam-specific report using a directional uplink beam transmitted by a UE, identify a beam-specific parameter indicating a maximum transmit power for the directional uplink beam based at least in part on receiving the beam-specific report, determine one or more uplink communication resources for the UE based at least in part on the beam-specific parameter, and transmit a message indicating a resource grant to the UE based at least in part on the one or more uplink communication resources.

A non-transitory computer-readable medium for wireless communication is described. The non-transitory computer-readable medium may include instructions operable to cause a processor to receive a beam-specific report using a directional uplink beam transmitted by a UE, identify a beam-specific parameter indicating a maximum transmit power for the directional uplink beam based at least in part on receiving the beam-specific report, determine one or more uplink communication resources for the UE based at least in part on the beam-specific parameter, and transmit a message indicating a resource grant to the UE based at least in part on the one or more uplink communication resources.

Some examples of the method, apparatus, and non-transitory computer-readable medium described above may further include processes, features, means, or instructions for identifying a second beam-specific parameter for a second directional uplink beam of the UE based at least in part on receiving the beam-specific report, wherein the beam-specific report received using the directional uplink beam includes the second beam-specific parameter for the second directional uplink beam.

Some examples of the method, apparatus, and non-transitory computer-readable medium described above may further include processes, features, means, or instructions for identifying a maximum transmit power for the second directional uplink beam based at least in part on the beam-specific report, wherein the second beam-specific parameter indicates the maximum transmit power for the second directional uplink beam.

Some examples of the method, apparatus, and non-transitory computer-readable medium described above may further include processes, features, means, or instructions for identifying a difference between a maximum transmit power and an estimated transmit power for the second directional uplink beam based at least in part on the beam-specific report, wherein the second beam-specific parameter indicates the difference for the second direction transmission beam.

Some examples of the method, apparatus, and non-transitory computer-readable medium described above may further include processes, features, means, or instructions for receiving a second beam-specific report using the directional uplink beam or a second directional uplink beam that includes a second beam-specific parameter for a third directional uplink beam. Some examples of the method, apparatus, and non-transitory computer-readable medium described above may further include processes, features, means, or instructions for identifying the second beam specific parameter for the third directional uplink beam based at least in part on the second beam-specific report, wherein determining the one or more uplink communication resources may be based at least in part on the second beam specific parameter for the third directional uplink beam.

In some examples of the method, apparatus, and non-transitory computer-readable medium described above, the beam-specific report or the second beam-specific report may be transmitted using a MAC CE carried on a PUSCH or UCI carried on a PUCCH or a combination thereof.

Some examples of the method, apparatus, and non-transitory computer-readable medium described above may further include processes, features, means, or instructions for identifying a second beam-specific parameter for the directional uplink beam, the second beam-specific parameter indicating a difference between the maximum transmit power and an estimated transmit power for the directional uplink beam, wherein the beam-specific report includes the second beam-specific parameter.

In some examples of the method, apparatus, and non-transitory computer-readable medium described above, the beam-specific parameter may be a PCMAX parameter. In some examples of the method, apparatus, and non-transitory computer-readable medium described above, the second beam-specific parameter may be a power headroom parameter.

In some examples of the method, apparatus, and non-transitory computer-readable medium described above, the beam-specific report may be a power headroom report that includes power information for a plurality of directional uplink beams associated with the UE.

Some examples of the method, apparatus, and non-transitory computer-readable medium described above may further include processes, features, means, or instructions for transmitting a second message to the UE requesting the beam-specific report, wherein receiving the beam-specific report may be based at least on transmitting the second message.

DETAILED DESCRIPTION

Some wireless communications systems may include various procedures to provide power control for uplink and/or downlink. Such power control procedures may determine the energy per resource element output by a transmitter (e.g., UE or base station) during a transmission (e.g., uplink or downlink). Some wireless communications systems may be configured to allow a UE to transmit signals to a base station using multiple signals at the same time. For example, in carrier aggregation the UE may use different component carriers to communicate information at, or about, the same time. Alternatively, in directional communications systems, the UE may use different directional uplink transmission beams to communicate different information at the same time. When transmitting different signals across different links at the same time, uplink power control procedures may be configured to ensure that the aggregate transmit power of the different signals does not exceed a maximum transmit power of the UE.

Techniques are provided for power control in directional beam environments. Specifically, one or more power parameters may be determined on a beam-by-beam basis. As such, each directional uplink transmission beam in a communication link may be independently controlled using these beam-specific power parameters. Examples of these beam-specific power parameters may include a maximum output power for a given directional uplink transmission beam and a difference between the maximum output power for the given directional uplink transmission beam and an estimated transmit power for the given directional uplink transmission beam. The UE may report one or more of these beam-specific power parameters to a base station in a beam-specific report.

Aspects of the disclosure are initially described in the context of a wireless communications system and also in the context of power statuses, communication schemes, and message structures. Aspects of the disclosure are further illustrated by and described with reference to apparatus diagrams, system diagrams, and flowcharts that relate to power control in directional beam environments.

Figure 1:
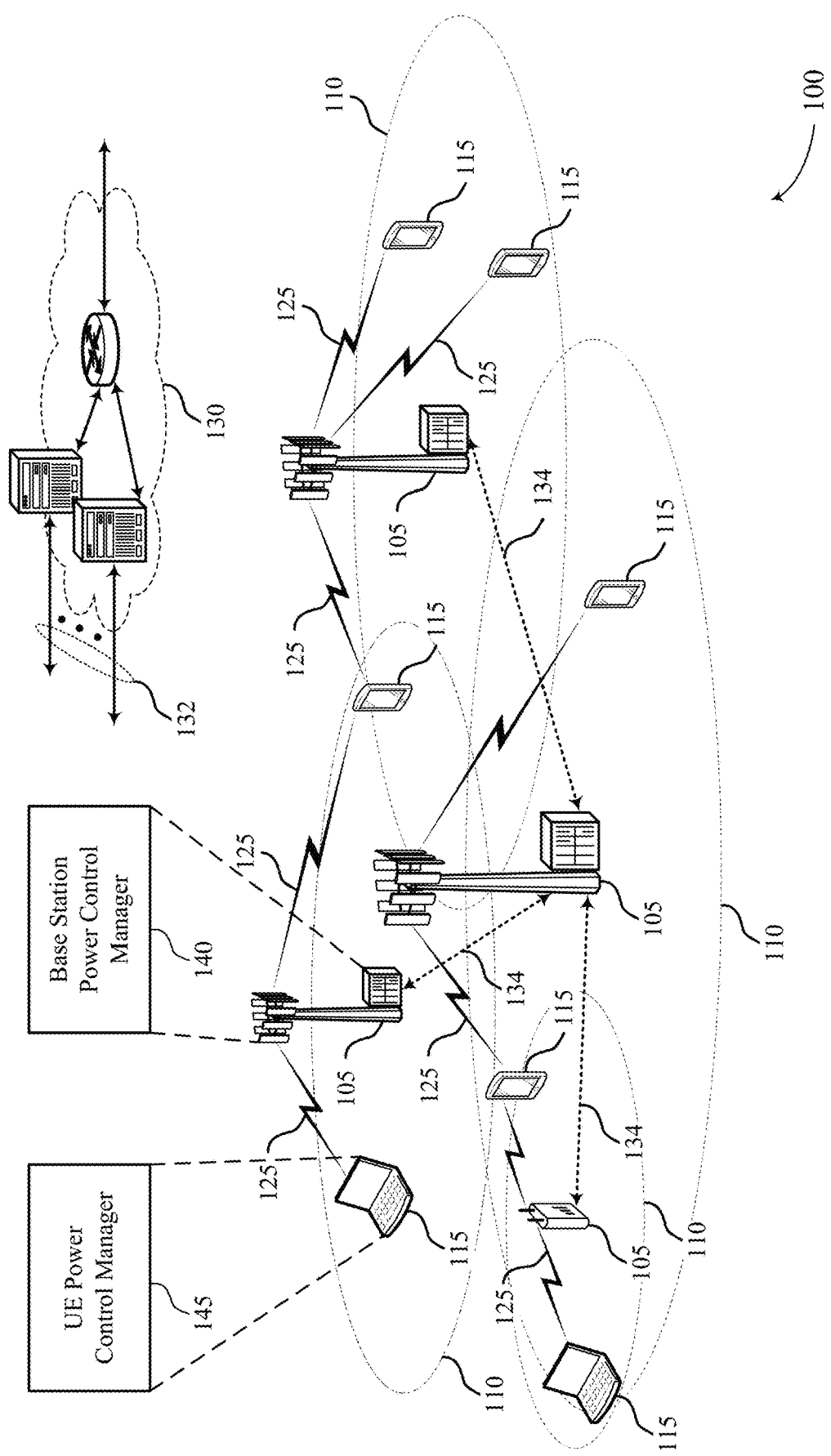
FIG. 1 illustrates an example of a system for wireless communication that supports power control in directional beam environments in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MEMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations, with respect to an antenna array, experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Wireless communication system 100 may utilize power management procedures to control power outputs of one or more transmissions. A base station 105 may include a base station control manager 140 that utilizes at least some of the power management techniques described herein. Likewise, a UE 115 may include a UE power control manager 145 that utilizes at least some of the power management techniques described herein. In some cases, the wireless communication system 100 may perform uplink power control procedures for multiple directional uplink transmission beams in a communication link between a UE 115 and a base station 105. The UE power control manager 145 of the UE 115 may determine one or more power parameters on a beam-bybeam basis. As such, each directional uplink transmission beam in the communication link may be independently controlled using these beam-specific power parameters. The UE 115 may report one or more of these beam-specific power parameters to the base station 105 in a beam-specific report.

Figure 2:
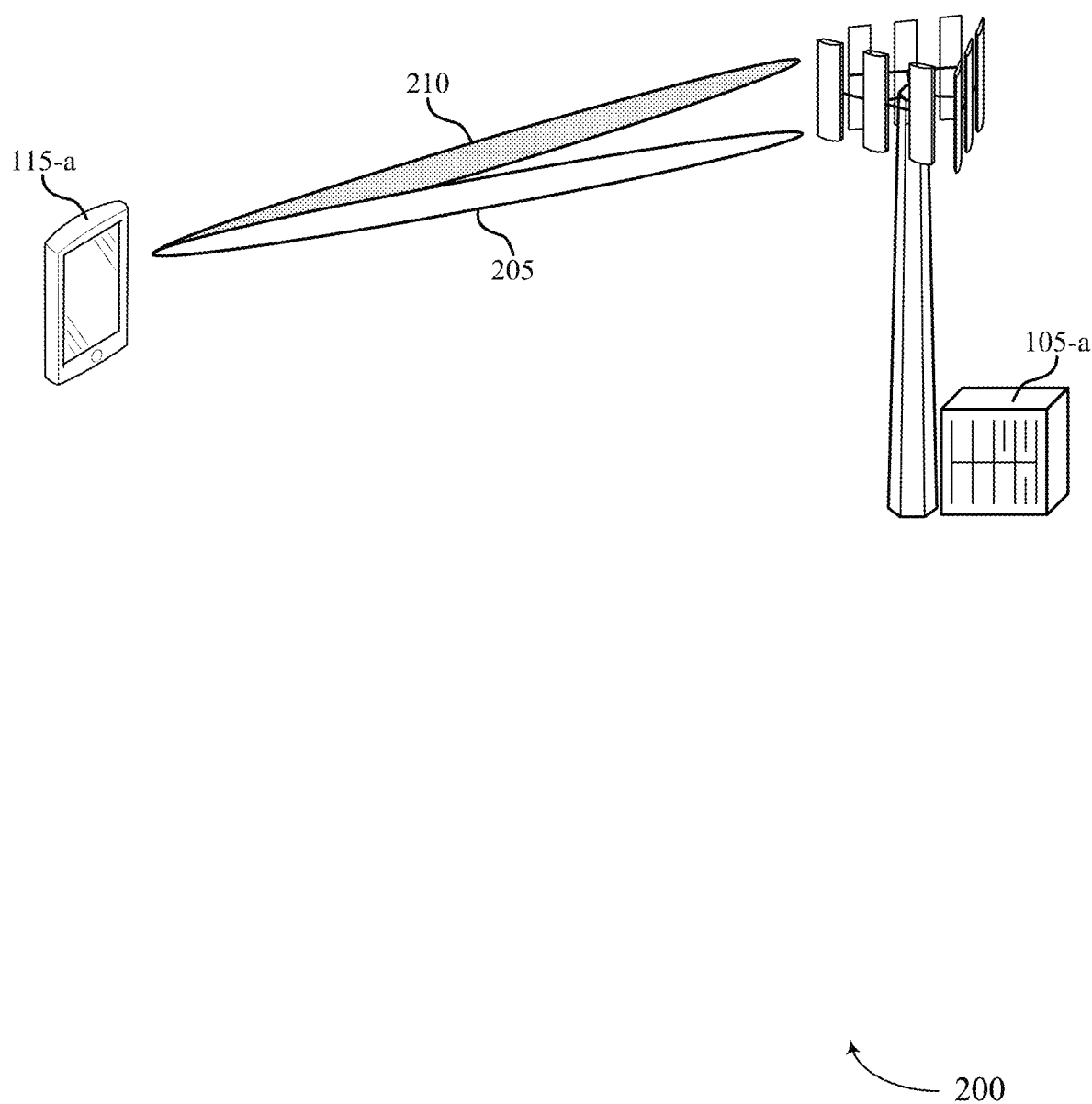
FIG. 2 illustrates an example of a wireless communication system that supports power control in directional beam environments in accordance with aspects of the present disclosure.

FIG. 2 illustrates an example of a wireless communication system 200 that supports power control in directional beam environments in accordance with various aspects of the present disclosure. In some examples, the wireless communication system 200 may implement aspects of wireless communication system 100. The wireless communication system 200 may include a UE 115-a and a base station 105-a.

The wireless communication system 200 may include various procedures to provide power control for uplink and/or downlink. For example, the power control procedures may include open-loop feedback components and closed-loop feedback components. Power control procedures may determine the energy per resource element output by a transmitter (e.g., UE 115-a or base station 105-a) during a transmission (e.g., uplink or downlink).

In some cases, the base station 105-a may communicate uplink transmit power control commands to the UE 115-a using downlink control information (DCI). In some situations, a UE 115-a may transmit uplink signals across links. For example, in carrier aggregation, the UE 115-a may transmit uplink signals using different component carriers at the same time. When transmitting different signals across different links at the same time, uplink power control procedures may be configured to ensure that the aggregate transmit power of the different signals does not exceed a maximum transmit power of the UE 115-a. A UE 115-a, based on hardware, firmware, software, and/or other features, may have an upper limit to how much transmit power it can output at given time. For example, power specifications and antenna specifications of the UE 115-a may limit the maximum total transmit power of the UE 115-a.

The wireless communication system 200 may be configured to use directional beam pair links (BPLs) to establish communication links between nodes (e.g., the base station 105-a and the UE 115-a). The BPLs may include a directional transmit beam formed by one entity (e.g., base station 105-a in the case of downlink) and a directional reception beam formed by the other entity (e.g., UE 115-a in the case of downlink). Each directional beam may be defined by a number of characteristics including beam width, beam direction, beam transmit power, beam frequency spectrum, and/or other characteristics.

In some cases, multiple BPLs may be established between a UE 115-a and a base station 105-a. When such is the case, the UE 115-a (and the base station 105-a) may be configured with uplink power control procedures that manage power on a per directional beam basis. Such beam-specific uplink power control procedures may be configured to allocate transmission power between multiple directional uplink transmission beams such that the aggregate total power transmitted by the UE 115-a does not, or is unlikely to, exceed some maximum threshold of output power of the UE 115-a. In some cases, the UE may not use multiple BPLs simultaneously, and hence the UE does not necessarily need to split its total available power among the multiple BPLs. Nevertheless, the UE may still need to determine some power control parameters on a beam-by-beam basis, and may additionally need to transmit one or more power headroom reports to indicate these parameters to other devices, such as the base station 105-a.

For example, the UE 115-a may establish a first directional uplink transmission beam 205 and a second directional uplink transmission beam 210 with the base station 105-a as part of at least two BPLs. The power control procedures of the UE 115-a may be configured to allocate transmission power on a per-beam basis. The power control procedures may also be configured to provide power reporting on a per-beam basis. For example, power headroom reports may be indexed based on directional beams. In one example, two active beams are identified. When providing power headroom reports, the report may indicate which beam it is associated with. This may be done by including a bit b in the report where b is 0 or 1. A "0" may indicate a first beam and a "1" may indicate a second beam. Alternatively, a bitmap b1b2 may be used where 01 refers to first beam, 10 refers to second, and 11 refers to both (e.g., the same configuration may be applied to both beams).

Note: active beams can be themselves identified via a QCL table (or TCI table) in association with some measured reference signals (like SSB or CSI-RS) While two directional uplink transmission beams are illustrated in FIG. 2, any number of directional uplink transmission beams may be established between the UE 115-a and the base station 105-a in other examples.

Figure 3:
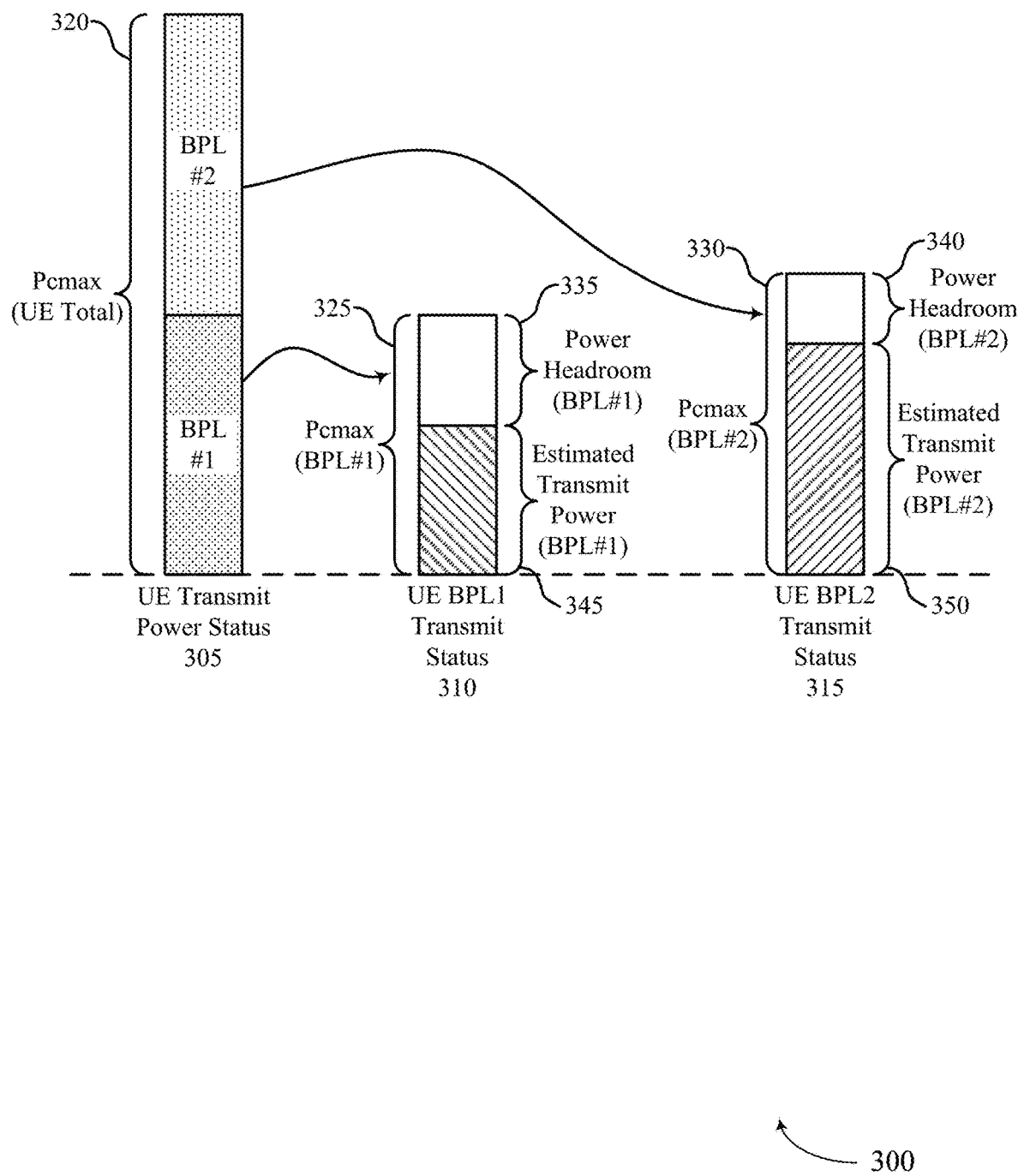
FIG. 3 illustrates an example of power statuses that support power control in directional beam environments in accordance with aspects of the present disclosure.

FIG. 3 illustrates an example of power statuses 300 that support power control in directional beam environments in accordance with various aspects of the present disclosure. In some examples, the power statuses 300 may implement aspects of wireless communications systems 100 and/or 200. The power statuses 300 illustrate one or more power control procedures for allocating a maximum transmission power between different directional beams and/or calculating a power headroom parameter for the different directional beams. The power statuses 300 may include a total UE transmit power status 305, a first BPL transmit power status (BPL1) 310, and a second transmit power status (BLP2) 315. While power statuses for two BPLs are represented, any number of beam pair links may be established between a UE (e.g., a UE 115) and a base station (e.g., a base station 105) in other cases.

A UE 115 may determine a configured maximum UE output power 320 (e.g., $P_{CMAX}$) for the UE and/or may determine a configured maximum UE output power 325, 330 for each directional uplink transmission beam (e.g., $P_{CMAX,b}$) of a communication link. For example, if the UE 115 is supporting two BPLs with a base station 105, the UE 115 may determine a maximum output power 325 (also referred to as a maximum transmission power) for the first BPL and a maximum output power 330 for the second BPL.

Allocation of power between beams may be based on a variety of factors. For instance, as part of allocating transmission power between different directional beams, the UE 115 may identify the maximum output power 320 (also referred to as a maximum transmission power) of the UE 115, identify a number of beams or BPLs being supported by the UE 115, identify various characteristics of the BPLs (e.g., width or direction). The UE 115 may be configured such that each directional beam has an independent transmit power control (TPC).

As part of determining a maximum transmission power for each BPL, the UE 115 may select the maximum output powers 325, 330 based on an upper limit (e.g., $P_{CMAX,U}$) and a lower limit (e.g., $P_{CMAX,L}$). In some cases, the lower limit may be determined using Equation 1:

$$P_{CMAX,L} = \min(P_{EMAX} - \Delta T_C, P_{powerclass} - \max(MPR + AMPR, PMPR) - \Delta T_C) \quad (1)$$

where $P_{EMAX}$ may be a maximum power that may be signaled by the base station 105, $\Delta T_C$ may be a reduction in the lower limit of maximum power when the signal is near a channel edge (e.g., with 4 MHz of the channel edge), MPR may be a maximum power reduction allowance, AMPR may be an additional MPR, and PMPR may be a power management MPR. The MPR may be based at least in part on a resource block allocation, a modulation coding scheme, or a combination thereof. In some examples, the base station 105 may inform the UE 115 of the AMPR.

In some cases, the upper limit may be determined using Equation 2:

$$P_{CMAX,U} = \min(P_{EMAX}, P_{powerclass}) \qquad (2)$$

The UE 115 may select a maximum output power 320 for itself that is bounded by the upper limit and the lower limit. In some cases, the UE 115 may determine an upper limit and a lower limit to a maximum output power on a per beam basis. In such cases, the UE 115 may select the maximum output powers 325, 330 based at least in part on the beam-specific upper limit, the beam-specific lower limit, the maximum power output for the UE 115, the number of beams or BPLs supported by the UE 115, or a combination thereof.

In some cases, the power output for each BPL or uplink transmission beam (e.g., 205, 210) may be independently controlled. As a result, each beam may have an independent TPC. In such cases, the maximum output power for each beam may not exceed the total maximum output power of the UE 115 (e.g. $P_{CMAX,b} \leq P_{TMAX}$). In some cases, however, the aggregate total output power of combined beams may exceed the total maximum output power ($P_{TMAX}$) of the UE 115 (e.g., $\Sigma_b P_{CMAX,b} \geq P_{TMAX}$).

To assist a base station 105 in managing communication resources, the UE 115 may provide a report (e.g., a power headroom report) to the base station 105. The power headroom report may be indexed for each individual directional beam (or BPL) of the communication link. The power headroom report may include a field specifying a maximum output power for each beam (e.g., power headroom parameters 335, 340), a power headroom parameter, or a combination thereof.

The power headroom parameter may indicate the power needs of a given directional uplink transmission beam based on the estimated traffic on the beam. For example, the power headroom parameter 335 for the first BPL may be a difference between a maximum output power 325 allocated to the first BPL and an estimated transmit power 345 of the first BPL. The estimated transmit power 345 may be based on an amount of communication resources allocated for a transmission (i.e., more allocated resources may result in a higher estimated transmit power).

In some cases, the estimated transmit power 345 may exceed the maximum output power 325. In such cases, the power headroom parameter 335 may be a negative value indicating that the UE 115 was asked to transmit with a total power that it cannot support. In such cases, the base station 105 may reduce the amount of resources for this transmission. After reducing the resources, however, the UE 115 may still have additional information to transmit because, presumably, the original grant of resources was based on an amount of information that the UE 115 would like to transmit. The base station 105 may assign additional communication resources (sometimes in a later resource grant) to communicate all of the information the UE 115 has buffered. The power headroom calculation for the second BPL may also include determining a difference between a maximum output power 330 allocated to the second BPL and an estimated transmit power 350 of the second BPL.

The power headroom parameter 335, 340 may be one of variety of types. For example, a first type of the power headroom parameter 335, 340 may take into account physical uplink shared channel (PUSCH). In a second type, the power headroom parameter 335, 340 may take into account PUSCH and a physical uplink control channel (PUCCH). In some cases, the first type may be used because the PUCCH may be allocated a consistent amount of communication resources and as such the variations in output power due to PUCCH may be minimal. In a third type, the power headroom parameters 335, 340 may be an actual power headroom parameter and/or an actual power headroom report based on communication resources allocated to the UE 115. In a fourth type, the power headroom parameters 335, 340 may be a virtual power headroom parameter and/or a virtual power headroom report based on a hypothetical assumption that a channel (e.g., PUSCH or PUCCH) is present. Any combination of these various types of power headroom parameters and/or power headroom reports may be possible.

The power headroom report (which may include both the maximum output powers 325, 330 and the power headroom parameters 335, 340 for each directional beam) may be communicated using a MAC CE (e.g., see the message structure 500 described with reference to FIG. 5). In some cases, the power headroom report may include a bit-map to indicate to which directional uplink transmission beam the various parameters refer. In some cases, the power headroom report may include a flag to indicate whether the power headroom report is virtual or not. In some cases, the power headroom report may include a flag to indicate whether the power headroom parameter includes PUCCH or not. In some cases, the power headroom report may indicate one or more types of the various parameters of the power headroom report (e.g., type 1, 2, 3, or 4 described herein). The power headroom report may be transmitted on a subframe for which the UE 115 has an uplink grant.

Figure 4:
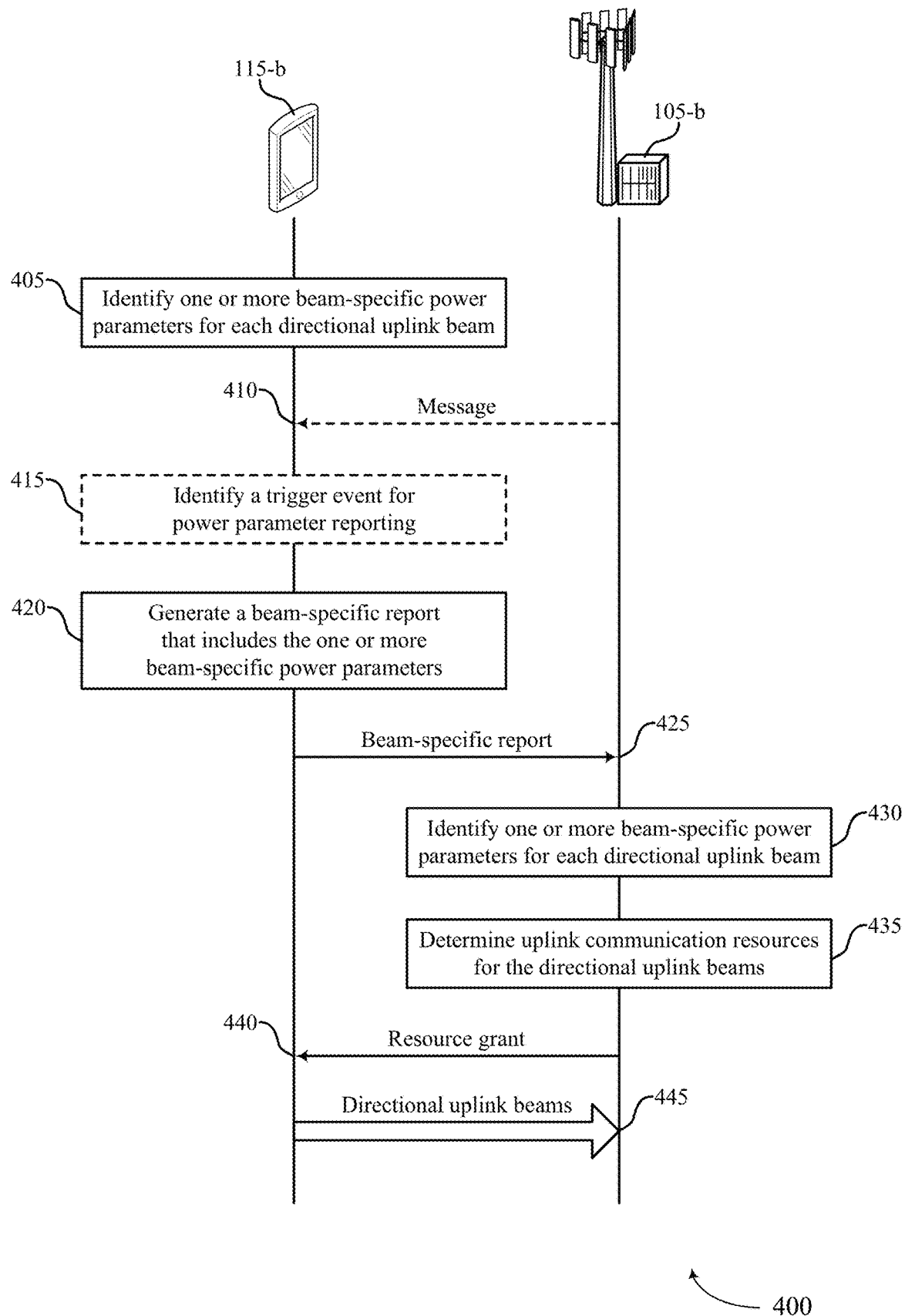
FIG. 4 illustrates an example of a communication scheme that supports power control in directional beam environments in accordance with aspects of the present disclosure.

FIG. 4 illustrates an example of a communication scheme 400 that supports power control in directional beam environments in accordance with various aspects of the present disclosure. In some examples, the communication scheme 400 may implement aspects of wireless communications systems 100 and/or 200. The communication scheme 400 illustrates examples of power control procedures that are based on individual directional beams. The communication scheme 400 includes functions and communications related to a UE 115-b and a base station 105-b.

At block 405, the UE 115-b may identify one or more beam-specific power parameters for each directional uplink beam associated with the UE 115-b and the base station 105-b. A beam-specific power parameter may indicate a power characteristic of an individual beam. An example of a beam-specific power parameter may include a maximum transmit power (e.g., maximum output power 325, 330 described with reference to FIG. 3). Another example of a beam-specific power parameter may include a power headroom parameter (e.g., power headroom parameters 335, 340). Another example of a beam-specific power parameter may be an estimated transmit power (e.g., estimated transmit powers 345, 350).

At block 420, the UE 115-b may generate a beam-specific report 425 that includes the one or more beam-specific power parameters. In some cases, the beam-specific report 425 may include one or more power parameters for each directional uplink transmission beam of the UE 115-b and associated with the base station 105-b. The beam-specific report may include a bit-map that associates a specific set of data elements (e.g., power parameters) with a specific directional beam for as many directional beams as are present in the communication link between the UE 115-b and the base station 105-b. The beam-specific report 425 may be an example of a power headroom report.

A single beam-specific report 425 may include information about multiple directional beams of the communication link. For example, the beam-specific report 425 may include power parameters for a first BPL, a second BPL, etc. for every BPL that is part of the communication link between the UE 115-b and the base station 105-b.

The beam-specific report 425 may be transmitted using one of the BPLs or directional uplink transmission beams. In some cases, the beam specific report 425 that is transmitted using a first BPL may include information about a second BPL that is not used to transmit the beam-specific report 425.

In some cases, the UE 115-b may generate and transmit a second beam-specific report. The second beam-specific report may be similarly embodied as the first beam-specific report 425 described herein. In some instances, the second beam-specific report may be transmitted using a different BPL than the first beam-specific report 425. In some instances, the second beam-specific report may include power parameters and/or other information not found in the first beam-specific report 425. The UE 115-b may determine whether the first beam-specific report 425 includes all of the relevant information for the base station 105-b. If it does not, the UE 115-b may generate the second beam-specific report. The second beam-specific report may be transmitted using the same BPL as the first beam-specific report 425 or may be transmitted using a different BPL. In some cases, the second beam-specific report includes information about the BPL that is used to transmit the first beam-specific report 425. In some examples, the second beam-specific report may include beam-specific power parameters about a second BPL and/or other BPLs other than the first BPL used to transmit the first beam-specific report 425.

In some cases, the beam-specific report 425 may be transmitted using a MAC CE carried on PUSCH. In some cases, the beam-specific report 425 may be transmitted using a MAC CE carried on PUCCH. In some cases, the beam-specific report 425 may be transmitted using UCI carried on PUCCH.

Performing the functions of block 420 and generating a beam-specific report 425 may be based on the UE 115-b identifying a trigger event for power parameter report at block 415. Examples of trigger events may include establishing a second directional uplink beam (or a second BPL as the case may be) with the base station 105-b, determining that a signal quality parameter associated with at least one of the directional uplink beams (or BPLs) satisfies a threshold, determining that a path loss estimation of at least one of the directional uplink beams (or BPLs) satisfies a threshold, determining that a received signal received power (RSRP) of a directional uplink beam (or BPLs) satisfies a threshold or has changed significantly from a previous value, determining that a timer (e.g., a prohibit timer) has expired, receiving a message 410 transmitted by the base station 105-b requesting the beam-specific report 425, determining that a configured number of TPC commands implemented by the UE 115-b satisfies a threshold, or a combination thereof. Other criteria for triggering a PHR may include a significant change since a previous path loss measurement, more than a threshold time has elapsed (e.g., a PHR prohibit timer), and the UE has implemented more than a selected number of TPC commands. In some cases, any of these factors may be determined on a beam-by-beam basis, may be determined for the entire UE, or may be determined for one or more subsets of directional beams (or BPLs). For example, a timer may be beam-specific. The base station 105-b may include functions and/or components to identify conditions for transmitting the message 410.

At block 430, the base station 105-b may identify one or more beam-specific power parameters for each directional uplink beam (or BPL) based on receiving the beam-specific report 425. The identification of the one or more beam-specific power parameters may be based on information included in the beam-specific report 425. The base station 105-b may identify which power parameters go with which directional beam or BPL. Examples of the one or more beam-specific power parameters may include a maximum output power, a power headroom parameter, or a combination thereof.

In some cases, the base station 105-b may identify parameters for multiple beams in the beam-specific report 425. In some cases, the base station 105-b may identify beam-specific power parameters for BPLs other than the BPL used to communicate the beam-specific report 425. The base station 105-b may associate beam-specific power parameters with specific directional beams or directional BPLs using a bit-map of the beam-specific report 425.

In some cases, the base station 105-b may receive a plurality of beam-specific reports from the UE 115-b. In such cases, the base station 105-b may identify beam-specific power parameters for the beams based on each of the plurality of beam-specific reports received from the UE 115-b.

At block 435, the base station 105-b may determine or assign one or more uplink communication resources to the UE 115-b for the directional uplink transmission beams (or BPLs) based on the identified power parameters. For example, if the power headroom parameter is negative, the base station 105-b may assign less communication resources to the UE 115-b for this transmission. In another example, if the power headroom parameter is positive (e.g., the UE 115-b has spare capacity), the base station 105-b may adjust the data rate of the transmission (either up or down). In some cases, the base station 105-b may reassign some or part of the communication resources for the specific directional beam of the UE 115-b to another beam or another UE 115.

The base station 105-b may use the beam-specific report 425 to assist in efficiently allocating resources between directional uplink transmission beams of the UE 115-b or between communication links of different UEs 115. Once the base station 105-b allocates its available uplink communication resources, the base station 105-b may transmit a resource grant 440 to the UE 115-b (and/or other UEs 115 which may also be affected) indicating various transmission parameters for directional uplink transmission beams 445 communicated by the UE 115-b. Such transmission parameters may include frequency spectrum resources to be used by the directional uplink transmission beams 445, time resources to be used by the directional uplink transmission beams 445 (e.g., frame, subframe, and/or slot), transmit power of the directional uplink transmission beam 445, data rate of the directional uplink transmission beam 445, or a combination thereof.

Figure 5:
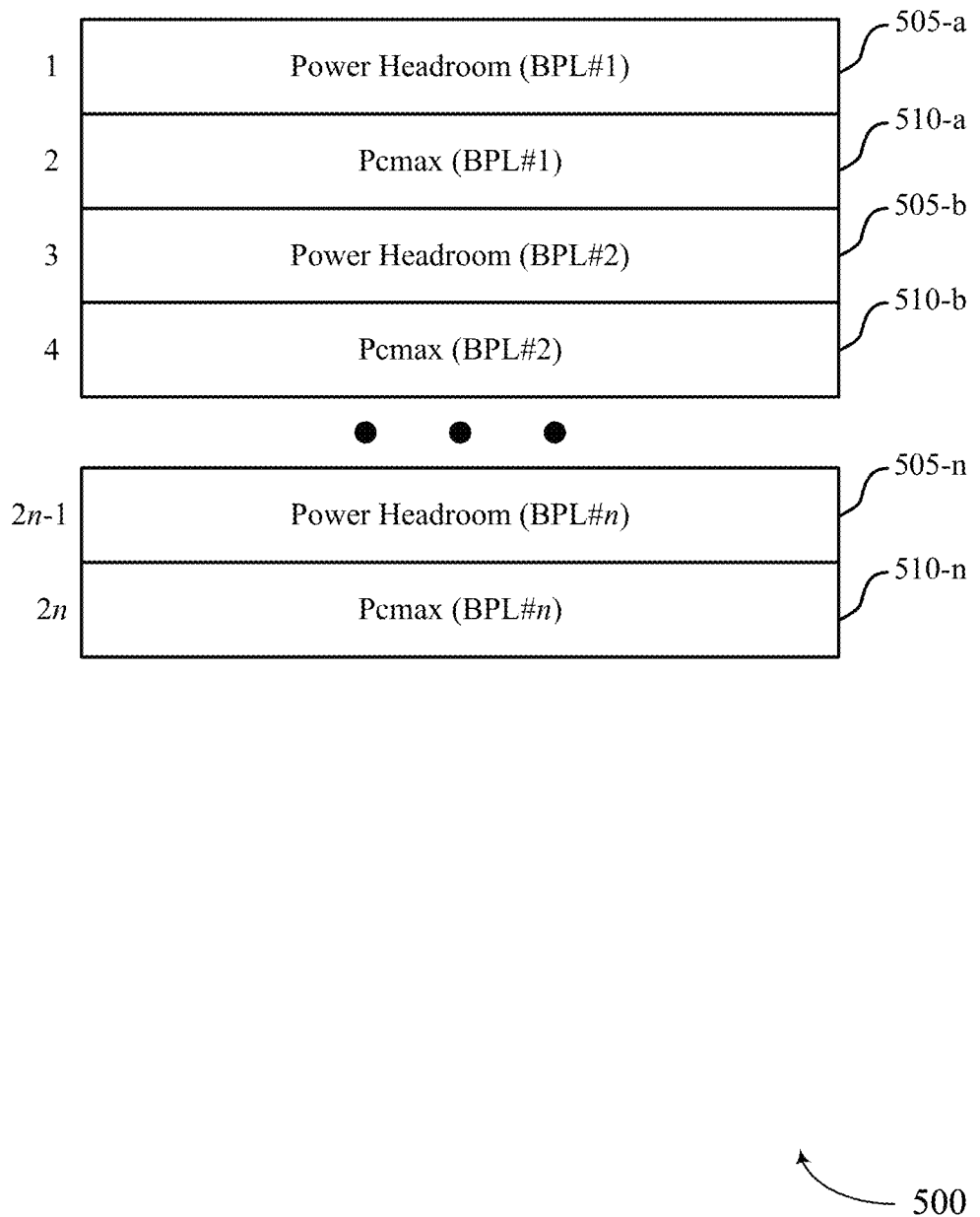
FIG. 5 illustrates an example of a message structure that supports power control in directional beam environments in accordance with aspects of the present disclosure.

FIG. 5 illustrates an example of a message structure 500 that supports power control in directional beam environments in accordance with various aspects of the present disclosure. In some examples, the message structure 500 may implement aspects of wireless communications systems 100 and/or 200. The message structure 500 illustrates an example of a beam-specific report that includes beam-specific power parameters.

The message structure 500 may include a maximum output power field 505-*n* for each directional beam indexed in the message structure 500 and a power headroom parameter field 510-*n* for each directional beam indexed in the message structure 500. In some cases, the message structure 500 may include only the maximum output power field 505-*n* or only the power headroom parameter field 510-*n*. However, in other cases, the message structure 500 may include both, and/or other, fields. In some cases, the message structure 500 may include eight bits dedicated to a single parameter for a single directional beam. In some cases, all eight of the bits may communicate information about the power parameter. In other cases, some of the bits may be reserved bits for other types of information such as flags or other control information. In other examples, other numbers of bits may be used.

In some cases, the message structure 500 may include a bit-map to indicate to which directional uplink transmission beam the various parameters refer. In some cases, the message structure 500 may include a flag to indicate whether the specific parameter is virtual or whether the entire message structure 500 is virtual. In some cases, the message structure 500 may include a flag to indicate whether a power headroom parameter includes PUCCH.

The message structure 500 may be transmitted on a subframe for which the UE 115 has an uplink grant. In some cases, the message structure 500 may be an example of a MAC CE communicated using PUSCH or PUCCH. In some cases, the message structure 500 may be an example of UCI communicated using PUCCH.

In some cases, the power control procedures described herein may be implemented in scenarios other than a wireless communication link between a UE 115 and a base station 105. For example, the procedures and functions described herein may be applied in a backhaul or integrated access and backhaul (IAB) scenario. In such examples, a first base station (or relay) may execute power control procedures for a communication link established with a second base station (or relay), where the first base station may adopt a UE functionality and the second base station may adopt a base station functionality. In other examples, the procedures and functions described herein may be applied in a device-to-device (e.g., UE-to-UE) scenario. In such examples, a first UE may be communicating with a second UE and may execute power control procedures for the communication link. In such D2D scenarios, one of the UEs may serve as the scheduler for the D2D link and the other UE may act as a served device. In the D2D scenario, either UE may adopt the functionality of the base station in the power control procedures and either UE may adopt the functionality of the UE in the power control procedures, as described herein.

Figure 6:
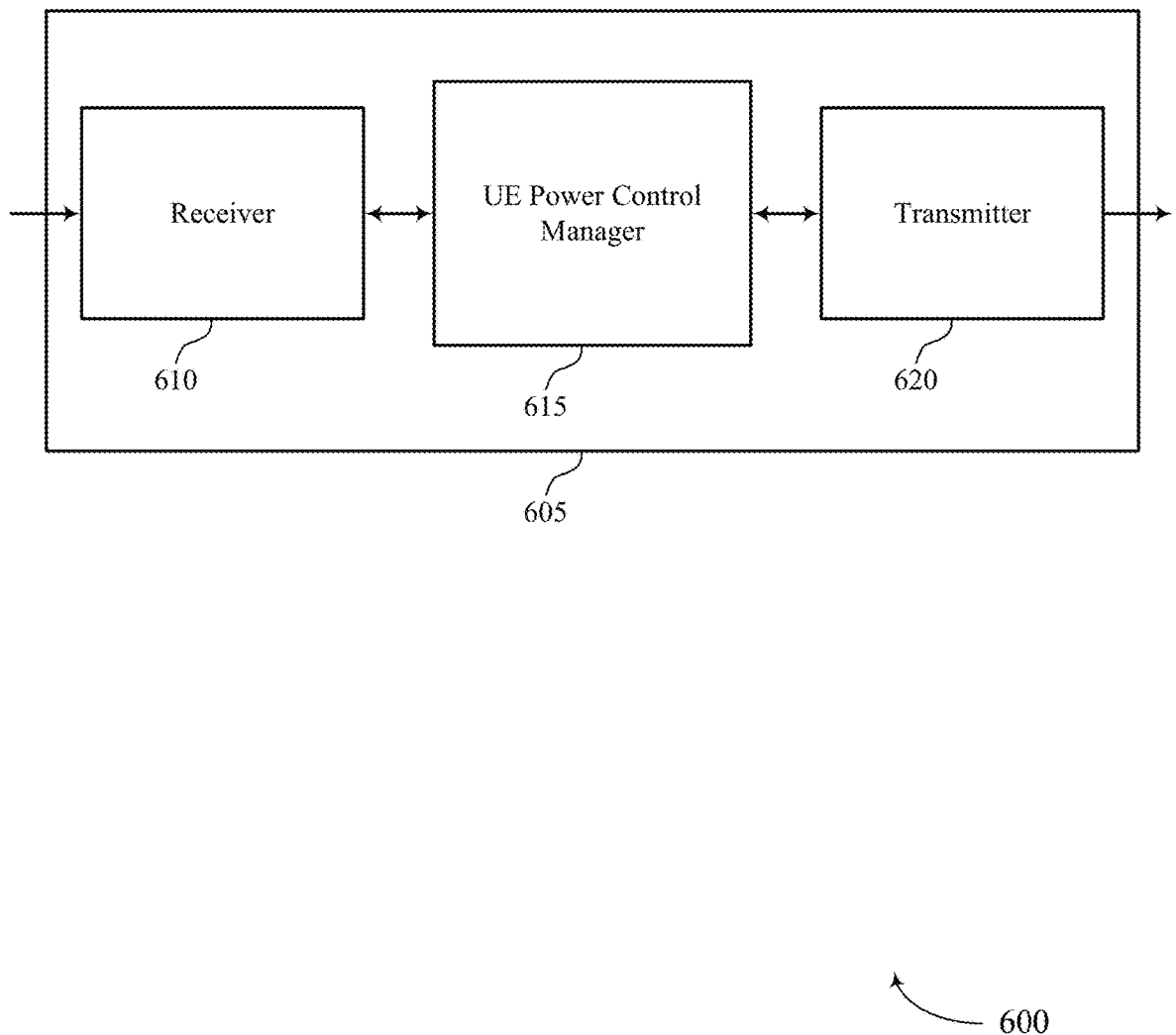
FIGS. 6 through 8 show block diagrams of a device that supports power control in directional beam environments in accordance with aspects of the present disclosure.

FIG. 6 shows a block diagram 600 of a wireless device 605 that supports power control in directional beam environments in accordance with aspects of the present disclosure. The wireless device 605 may be an example of aspects of a UE 115 as described herein. The wireless device 605 may include a receiver 610, a UE power control manager 615, and a transmitter 620. The wireless device 605 may also include a processor. Each of these components may be in communication with one another (e.g., via one or more buses).

The receiver 610 may receive information such as packets, user data, or control information associated with various information channels (e.g., control channels, data channels, and information related to power control in directional beam environments, etc.). Information may be passed on to other components of the device. The receiver 610 may be an example of aspects of the transceiver 935 described with reference to FIG. 9. The receiver 610 may utilize a single antenna or a set of antennas.

The UE power control manager 615 may be an example of aspects of the UE power control managers 145 and 915 described with reference to FIGS. 1 and 9, respectively. The UE power control manager 615 and/or at least some of its various sub-components may be implemented in hardware, software executed by a processor, firmware, or any combination thereof. If implemented in software executed by a processor, the functions of the UE power control manager 615 and/or at least some of its various sub-components may be executed by a general-purpose processor, a digital signal processor (DSP), an application-specific integrated circuit (ASIC), an field-programmable gate array (FPGA) or other programmable logic device (PLD), discrete gate or transistor logic, discrete hardware components, or any combination thereof designed to perform the functions described in the present disclosure. The UE power control manager 615 and/or at least some of its various sub-components may be physically located at various positions, including being distributed such that portions of functions are implemented at different physical locations by one or more physical devices. In some examples, UE power control manager 615 and/or at least some of its various sub-components may be a separate and distinct component in accordance with various aspects of the present disclosure. In other examples, UE power control manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The UE power control manager 615 may identify a beam-specific parameter indicating a maximum transmit power for a directional uplink beam of a UE, generate a beam-specific report that includes the beam-specific parameter, and transmit the beam-specific report using the directional uplink beam. The UE power control manager 615 may also perform the various techniques described herein for power control management.

The transmitter 620 may transmit signals generated by other components of the device 605. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
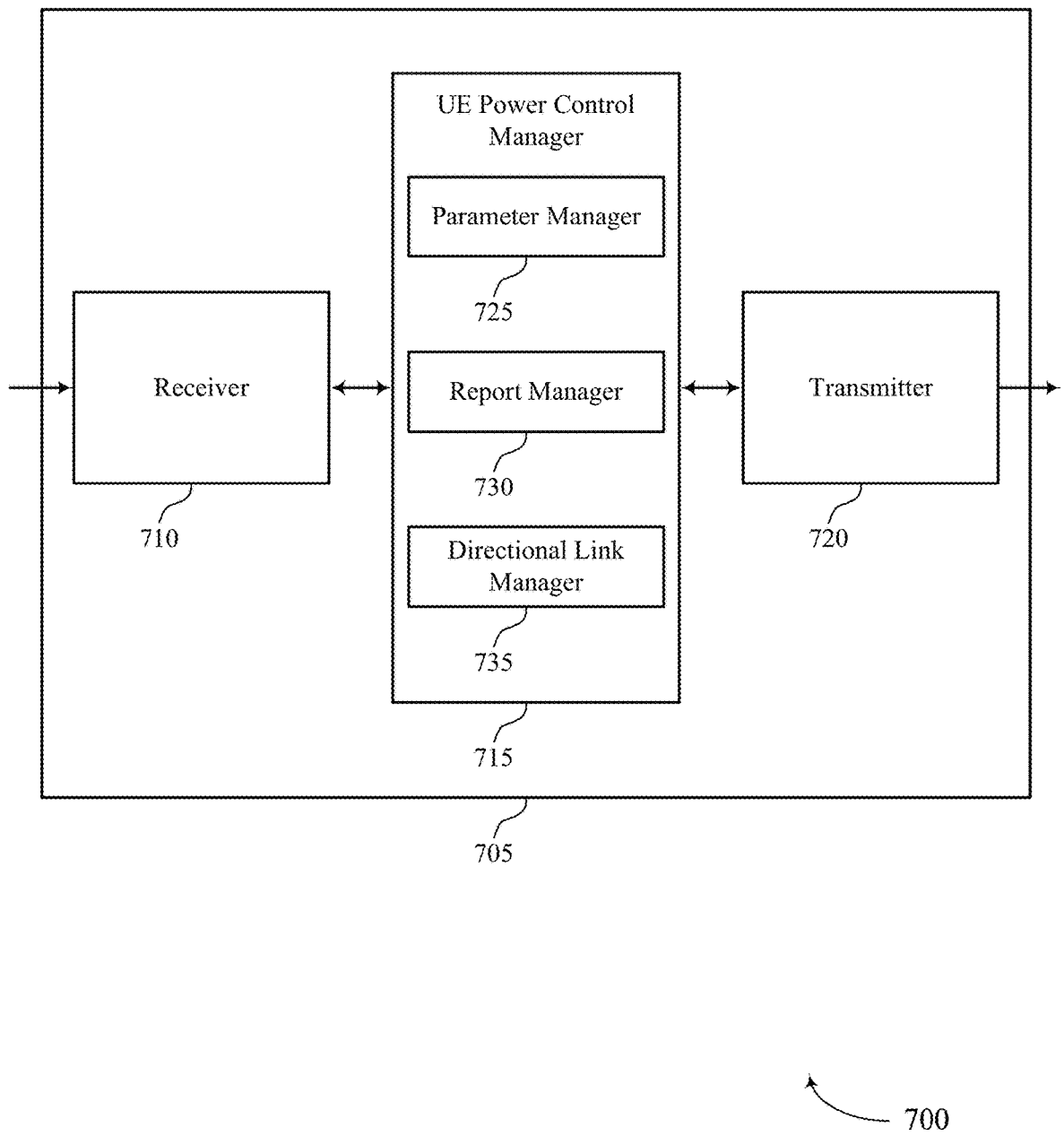

FIG. 7 shows a block diagram 700 of a wireless device 705 that supports power control in directional beam environments in accordance with aspects of the present disclosure. The wireless device 705 may be an example of aspects of a wireless device 605 or a UE 115 as described with reference to FIG. 6. The wireless device 705 may include a receiver 710, a UE power control manager 715, and a transmitter 720. The wireless device 705 may also include a processor. Each of these components may be in communication with one another (e.g., via one or more buses).

The receiver 710 may receive information such as packets, user data, or control information associated with various information channels (e.g., control channels, data channels, and information related to power control in directional beam environments, etc.). Information may be passed on to other components of the device. The receiver 710 may be an example of aspects of the transceiver 935 described with reference to FIG. 9. The receiver 710 may utilize a single antenna or a set of antennas.

The UE power control manager 715 may be an example of aspects of the UE power control manager 915 described with reference to FIG. 9. The UE power control manager 715 may also include a parameter manager 725, a report manager 730, and a directional link manager 735.

The parameter manager 725 may identify one or more parameters or power settings and/or allocations. For example, the parameter manager 725 may identify a beam-specific parameter indicating a maximum transmit power for a directional uplink beam of a UE or a second beam-specific parameter for a second directional uplink beam of the UE. The parameter manager 725 may identify a maximum transmit power for the second directional uplink beam, where the second beam-specific parameter indicates the identified maximum transmit power for the second directional uplink beam. The parameter manager 725 may also identify a second beam-specific parameter for the directional uplink beam, the second beam-specific parameter indicating a difference between the maximum transmit power and an estimated transmit power for the directional uplink beam, where the beam-specific report includes the second beam-specific parameter. In some cases, the beam-specific parameter is a $P_{CMAX}$ parameter. In some examples, the $P_{CMAX}$ parameter is transmitted along with PHR in the same MAC CE and a bit-map to indicate to which secondary component carrier (SCC) the information corresponds. In some examples, a flag may indicate whether the $P_{CMAX}$ parameter is virtual or not. In some cases, the second beam-specific parameter is a power headroom parameter.

The report manager 730 may generate a beam-specific report that includes the beam-specific parameter and generate a second beam-specific report that includes a second beam-specific parameter for a second directional uplink beam. In some cases, the beam-specific report is a power headroom report that includes power information for a set of directional uplink beams associated with the UE.

The directional link manager 735 may transmit the beam-specific report using the directional uplink beam, transmit the beam-specific report with the second beam-specific parameter and the beam-specific parameter using the directional uplink beam, and transmit the second beam-specific report using the directional uplink beam or the second directional uplink beam. In some cases, the second beam-specific report is transmitted using a MACCE carried on a PUSCH or UCI carried on a PUCCH or a combination thereof. In some cases, the beam-specific report is transmitted using a MAC CE carried on a PUSCH on the first directional uplink beam or UCI carried on a PUCCH on the first direction uplink beam or a combination thereof.

The transmitter 720 may transmit signals generated by other components of the device 705. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
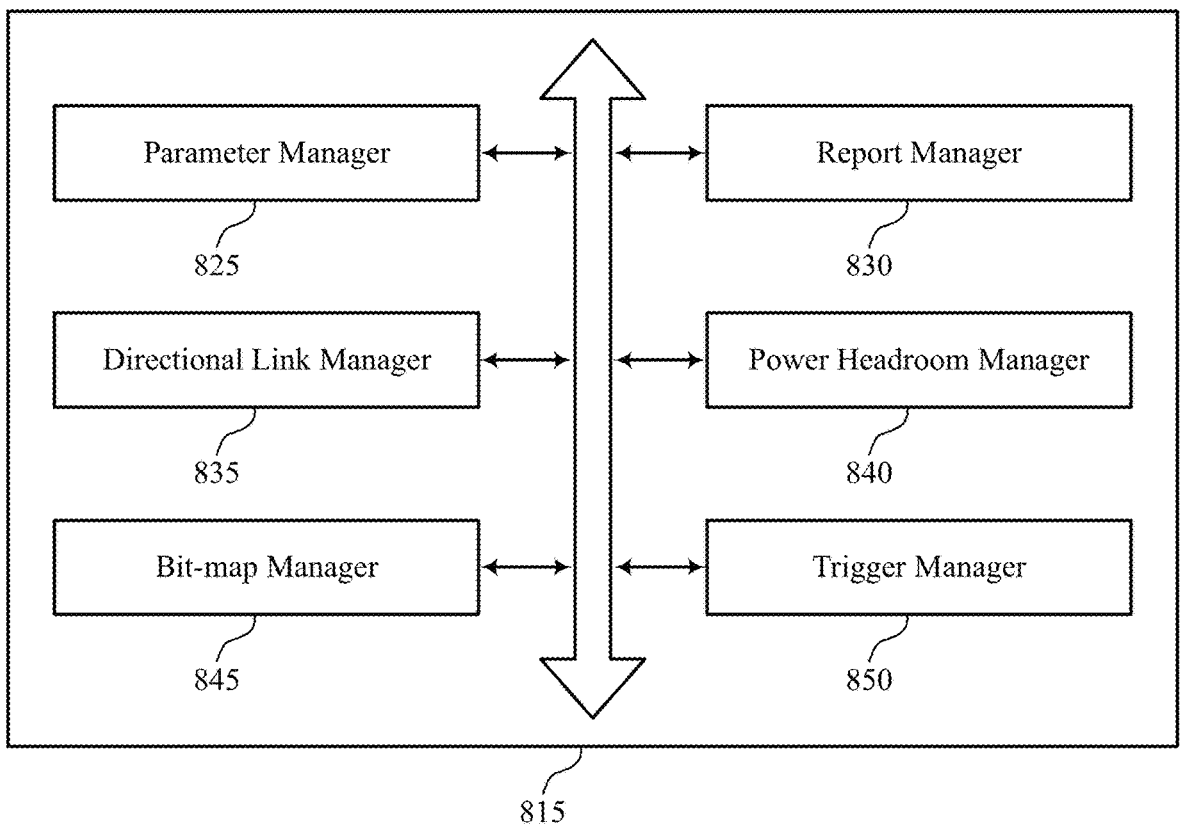

FIG. 8 shows a block diagram 800 of a UE power control manager 815 that supports power control in directional beam environments in accordance with aspects of the present disclosure. The UE power control manager 815 may be an example of aspects of a UE power control manager 615, 715, or 915 described with reference to FIGS. 6, 7, and 9. The UE power control manager 815 may include a parameter manager 825, a report manager 830, a directional link manager 835, a power headroom manager 840, a bit-map manager 845, and a trigger manager 850. Each of these modules may communicate, directly or indirectly, with one another (e.g., via one or more buses).

The parameter manager 825 may identify one or more parameters or power settings and/or allocations. For example, the parameter manager 825 may identify a beam-specific parameter indicating a maximum transmit power for a directional uplink beam of a UE and/or a second beam-specific parameter for a second directional uplink beam of the UE. The parameter manager 825 may identify a maximum transmit power for the second directional uplink beam, where the second beam-specific parameter indicates the identified maximum transmit power for the second directional uplink beam. The parameter manager 825 may identify a second beam-specific parameter for the directional uplink beam, the second beam-specific parameter indicating a difference between the maximum transmit power and an estimated transmit power for the directional uplink beam, where the beam-specific report includes the second beam-specific parameter. In some cases, the beam-specific parameter is a $P_{CMAX}$ parameter. In some cases, the second beam-specific parameter is a power headroom parameter.

The report manager 830 may generate a beam-specific report that includes the beam-specific parameter and generate a second beam-specific report that includes a second beam-specific parameter for a second directional uplink beam. In some cases, the beam-specific report is a power headroom report that includes power information for a set of directional uplink beams associated with the UE.

The directional link manager 835 may transmit the beam-specific report using the directional uplink beam, transmit the beam-specific report with the second beam-specific parameter and the beam-specific parameter using the directional uplink beam, and transmit the second beam-specific report using the directional uplink beam or the second directional uplink beam. In some cases, the beam-specific report and/or the second beam-specific report is transmitted using a medium access control MAC CE carried on a PUSCH or UCI carried on a PUCCH or a combination thereof. In some cases, the PUSCH and/or the PUCCH may be on the first directional uplink beam.

The power headroom manager 840 may identify a difference between a maximum transmit power for the second directional uplink beam and an estimated transmit power for the second directional uplink beam, where the second beam-specific parameter indicates the identified difference.

The bit-map manager 845 may generate a bit-map that associates a first set of data elements of the beam-specific report with the beam-specific parameter and a second set of data elements of the beam-specific report with the second beam-specific parameter.

The trigger manager 850 may identify a trigger event associated with the directional uplink beam, where generating the beam-specific report is based on identifying the trigger event. In some cases, the trigger event includes at least one of an establishment of a second directional uplink beam with a base station, or a determination that a signal quality parameter associated with the directional uplink beam satisfies a threshold, or a determination that a timer associated with the directional uplink beam has expired, or receipt of a message requesting receipt of the beam-specific report, or a combination thereof.

Figure 9:
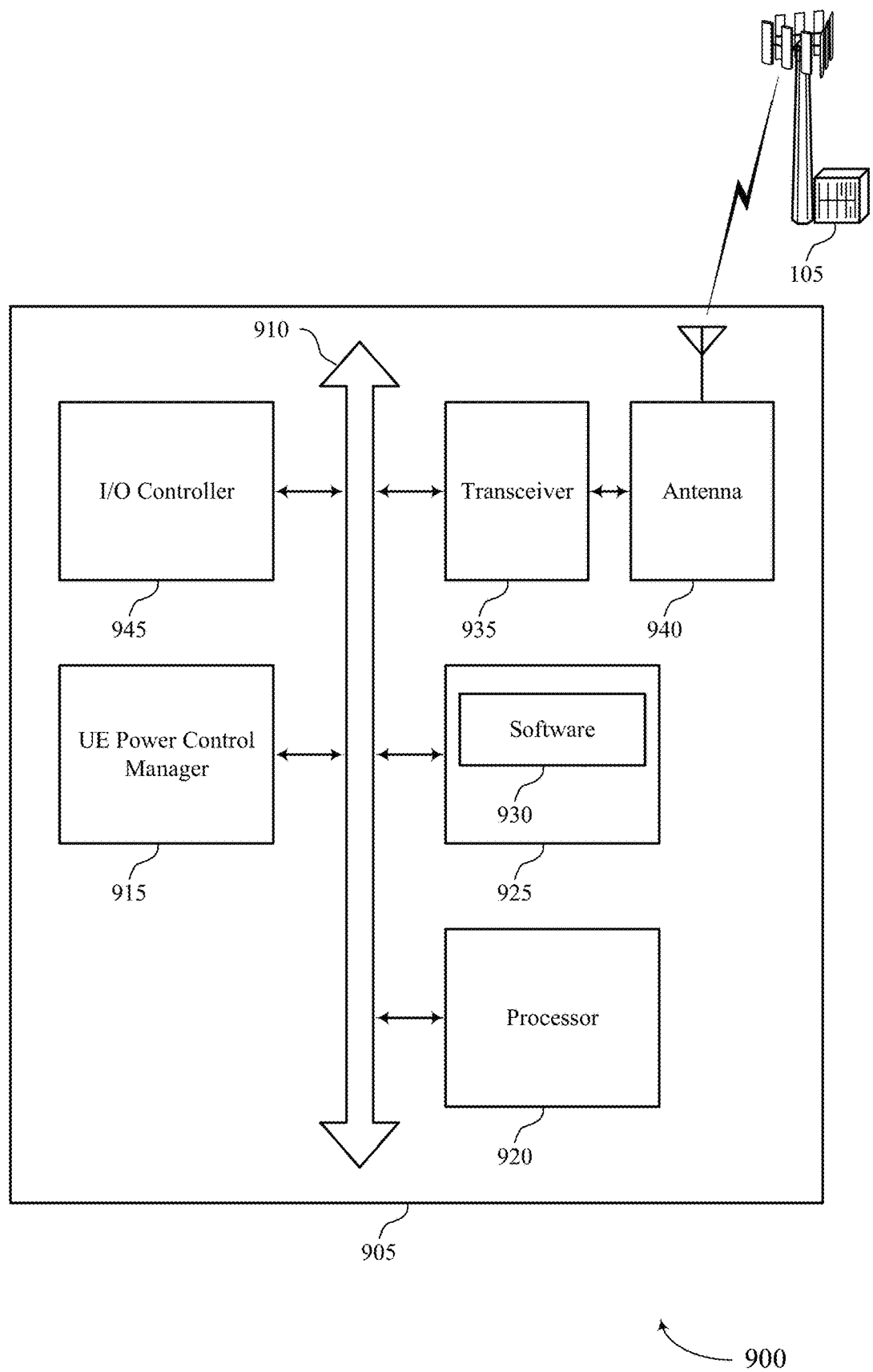
FIG. 9 illustrates a block diagram of a system including a UE that supports power control in directional beam environments in accordance with aspects of the present disclosure.

FIG. 9 shows a diagram of a system 900 including a device 905 that supports power control in directional beam environments in accordance with aspects of the present disclosure. The device 905 may be an example of or include the components of the wireless device 605, the wireless device 705, or a UE 115 as described above, e.g., with reference to FIGS. 6 and 7. The device 905 may include components for bi-directional voice and data communications including components for transmitting and receiving communications, including a UE power control manager 915, a processor 920, memory 925, software 930, a transceiver 935, an antenna 940, and an I/O controller 945. These components may be in electronic communication via one or more buses (e.g., a bus 910). The device 905 may communicate wirelessly with one or more base stations 105.

The processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 920 may be configured to operate a memory array using a memory controller. In other cases, a memory controller may be integrated into the processor 920. The processor 920 may be configured to execute computer-readable instructions stored in a memory to perform various functions (e.g., functions or tasks supporting power control in directional beam environments).

The memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

The software 930 may include code to implement aspects of the present disclosure, including code to support power control in directional beam environments. The software 930 may be stored in a non-transitory computer-readable medium such as system memory or other memory. In some cases, the software 930 may not be directly executable by the processor but may cause a computer (e.g., when compiled and executed) to perform functions described herein.

The transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device 905 may include a single antenna 940. However, in some cases the device 905 may have more than one antenna 940, which may be capable of concurrently transmitting or receiving multiple wireless transmissions.

The I/O controller 945 may manage input and output signals for the device 905. The I/O controller 945 may also manage peripherals not integrated into device 905. In some cases, the I/O controller 945 may represent a physical connection or port to an external peripheral. In some cases, the I/O controller 945 may utilize an operating system such as iOS®, ANDROID®, MS-DOS®, MS-WINDOWS®, OS/2®, UNIX®, LINUX®, or another known operating system. In other cases, the I/O controller 945 may represent or interact with a modem, a keyboard, a mouse, a touchscreen, or a similar device. In some cases, the I/O controller 945 may be implemented as part of a processor. In some cases, a user may interact with the device 905 via the I/O controller 945 or via hardware components controlled by the I/O controller 945.

Figure 10:
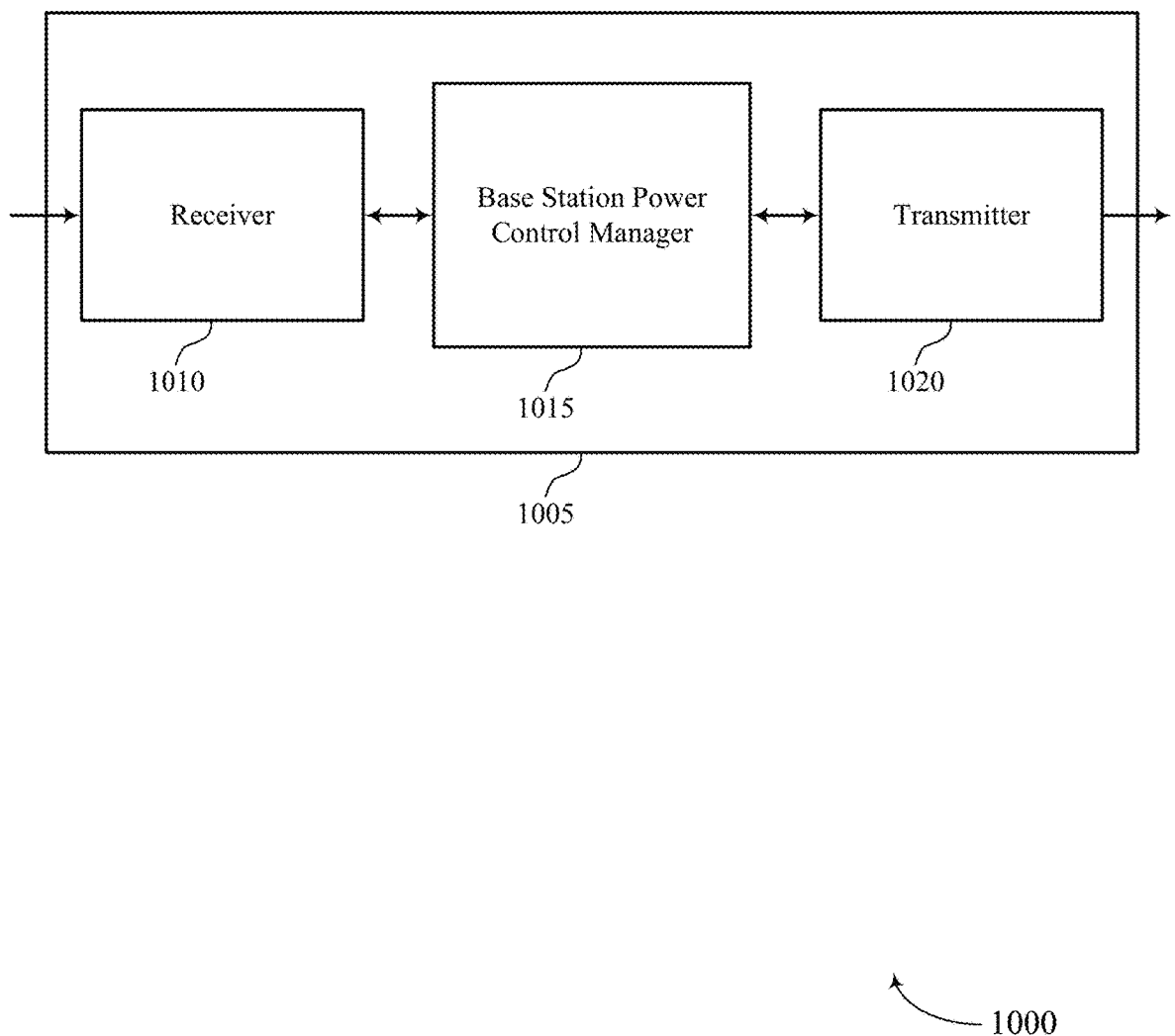
FIGS. 10 through 12 show block diagrams of a device that supports power control in directional beam environments in accordance with aspects of the present disclosure.

FIG. 10 shows a block diagram 1000 of a wireless device 1005 that supports power control in directional beam environments in accordance with aspects of the present disclosure. The wireless device 1005 may be an example of aspects of a base station 105 as described herein. The wireless device 1005 may include a receiver 1010, a base station power control manager 1015, and a transmitter 1020. The wireless device 1005 may also include a processor. Each of these components may be in communication with one another (e.g., via one or more buses).

The receiver 1010 may receive information such as packets, user data, or control information associated with various information channels (e.g., control channels, data channels, and information related to power control in directional beam environments, etc.). Information may be passed on to other components of the device 1005. The receiver 1010 may be an example of aspects of the transceiver 1335 described with reference to FIG. 13. The receiver 1010 may utilize a single antenna or a set of antennas.

The base station power control manager 1015 may be an example of aspects of the base station power control managers 140 and 1315 described with reference to FIGS. 1 and 13, respectively. The base station power control manager 1015 and/or at least some of its various sub-components may be implemented in hardware, software executed by a processor, firmware, or any combination thereof. If implemented in software executed by a processor, the functions of the base station power control manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station power control manager 1015 and/or at least some of its various sub-components may be physically located at various positions, including being distributed such that portions of functions are implemented at different physical locations by one or more physical devices. In some examples, the base station power control manager 1015 and/or at least some of its various sub-components may be a separate and distinct component in accordance with various aspects of the present disclosure. In other examples, the base station power control manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The base station power control manager 1015 may receive a beam-specific report using a directional uplink beam transmitted by a UE, identify a beam-specific parameter indicating a maximum transmit power for the directional uplink beam based on receiving the beam-specific report, determine one or more uplink communication resources for the UE based on the beam-specific parameter, and transmit a message indicating a resource grant to the UE based on the one or more uplink communication resources.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
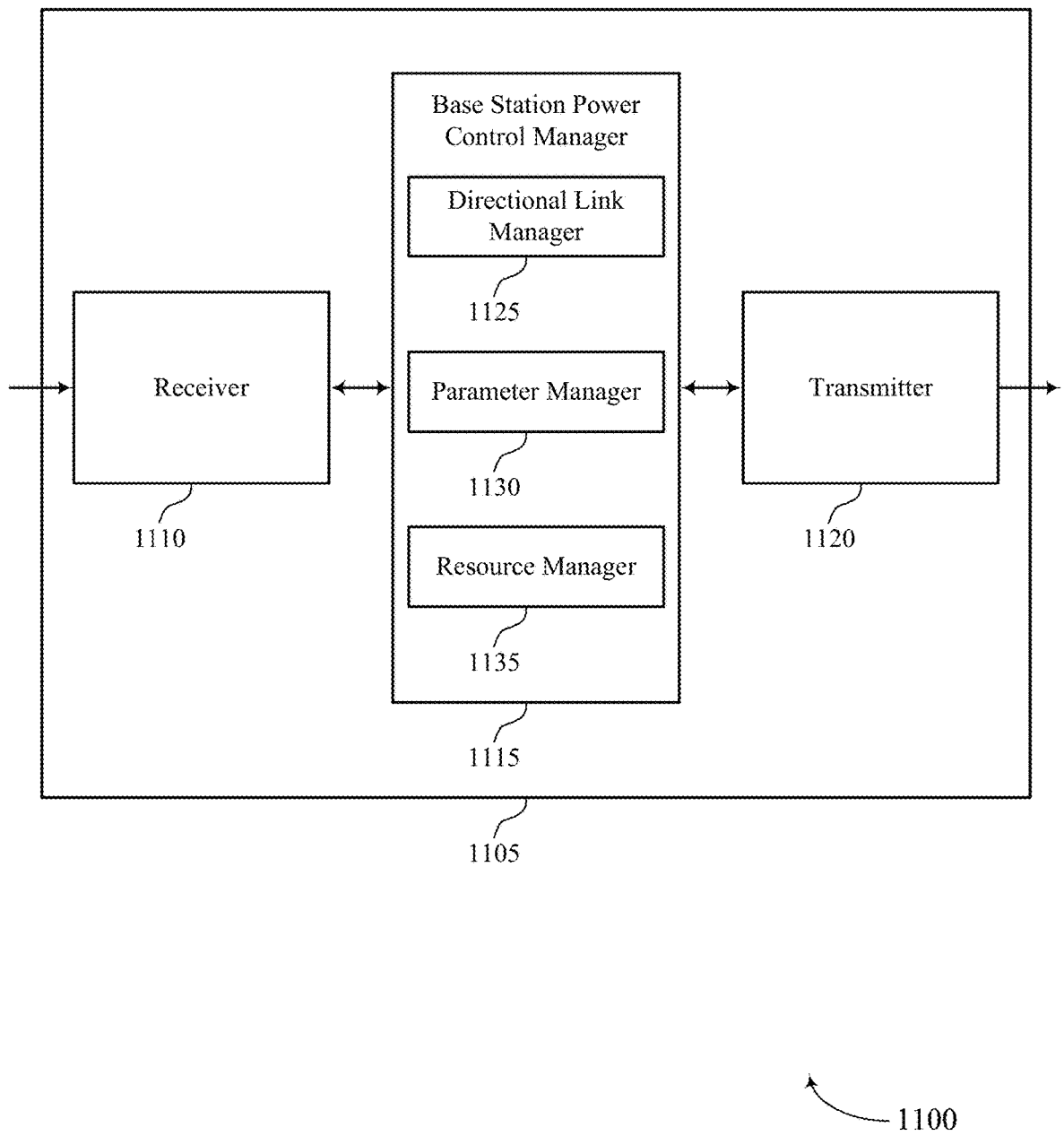

FIG. 11 shows a block diagram 1100 of a wireless device 1105 that supports power control in directional beam environments in accordance with aspects of the present disclosure. The wireless device 1105 may be an example of aspects of a wireless device 1005 or a base station 105 as described with reference to FIG. 10. The wireless device 1105 may include a receiver 1110, a base station power control manager 1115, and a transmitter 1120. The wireless device 1105 may also include a processor. Each of these components may be in communication with one another (e.g., via one or more buses).

The receiver 1110 may receive information such as packets, user data, or control information associated with various information channels (e.g., control channels, data channels, and information related to power control in directional beam environments, etc.). Information may be passed on to other components of the device. The receiver 1110 may be an example of aspects of the transceiver 1335 described with reference to FIG. 13. The receiver 1110 may utilize a single antenna or a set of antennas.

The base station power control manager 1115 may be an example of aspects of the base station power control manager 1315 described with reference to FIG. 13. The base station power control manager 1115 may also include a directional link manager 1125, a parameter manager 1130, and a resource manager 1135.

The directional link manager 1125 may receive a beam-specific report using a directional uplink beam transmitted by a UE, transmit a message indicating a resource grant to the UE based on the one or more uplink communication resources, and transmit a second message to the UE requesting the beam-specific report, where receiving the beam-specific report is based at least on transmitting the second message.

The parameter manager 1130 may identify one or more parameters or power settings and/or allocations. For example, the parameter manager 1130 may identify a beam-specific parameter indicating a maximum transmit power for the directional uplink beam based on receiving the beam-specific report or identify a second beam-specific parameter for a second directional uplink beam of the UE based on receiving the beam-specific report, where the beam-specific report received using the directional uplink beam includes the second beam-specific parameter for the second directional uplink beam. In other examples, the parameter manager 1130 may identify a maximum transmit power for the second directional uplink beam based on the beam-specific report, where the second beam-specific parameter indicates the maximum transmit power for the second directional uplink beam. The parameter manager 1130 may identify the second beam specific parameter for the third directional uplink beam based on the second beam-specific report, where determining the one or more uplink communication resources is based on the second beam specific parameter for the third directional uplink beam. In yet other examples, the parameter manager 1130 may identify a second beam-specific parameter for the directional uplink beam, the second beam-specific parameter indicating a difference between the maximum transmit power and an estimated transmit power for the directional uplink beam, where the beam-specific report includes the second beam-specific parameter. In some cases, the second beam-specific report is transmitted using a medium access control (MAC) control element (CE) carried on a PUSCH or uplink control information (UCI) carried on a PUCCH or a combination thereof. In some cases, the beam-specific report is transmitted using a MAC CE carried on a PUSCH on the first directional uplink beam or UCI carried on a PUCCH on the first direction uplink beam or a combination thereof. In some cases, the beam-specific parameter is a $P_{CMAX}$ parameter. In some cases, the second beam-specific parameter is a power headroom parameter.

The resource manager 1135 may determine one or more uplink communication resources for the UE based on the beam-specific parameter.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
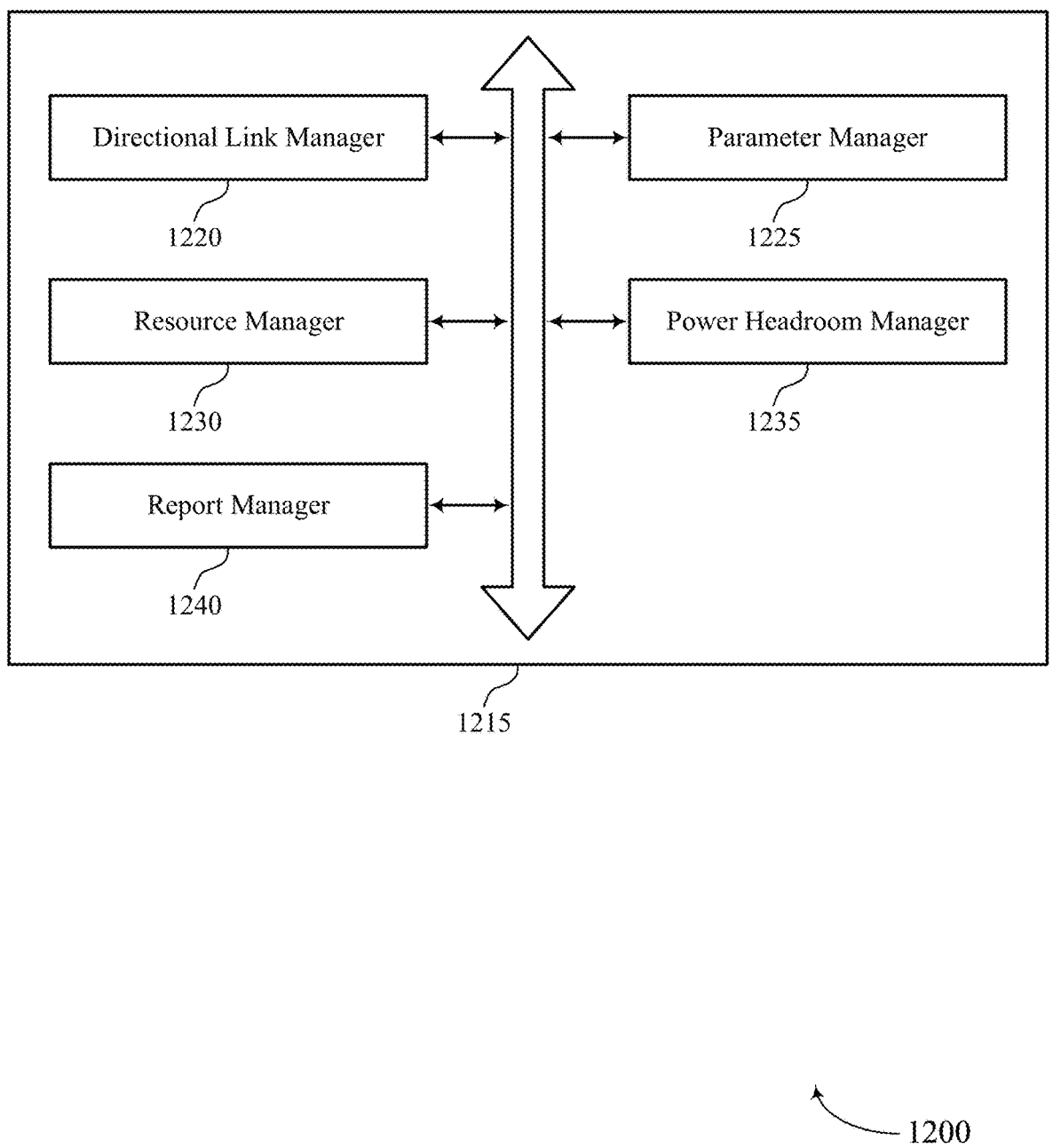

FIG. 12 shows a block diagram 1200 of a base station power control manager 1215 that supports power control in directional beam environments in accordance with aspects of the present disclosure. The base station power control manager 1215 may be an example of aspects of a base station power control manager 1315 described with reference to FIGS. 10, 11, and 13. The base station power control manager 1215 may include a directional link manager 1220, a parameter manager 1225, a resource manager 1230, a power headroom manager 1235, and a report manager 1240. Each of these modules may communicate, directly or indirectly, with one another (e.g., via one or more buses).

The directional link manager 1220 may receive a beam-specific report using a directional uplink beam transmitted by a UE, transmit a message indicating a resource grant to the UE based on the one or more uplink communication resources, and transmit a second message to the UE requesting the beam-specific report, where receiving the beam-specific report is based at least on transmitting the second message.

The parameter manager 1225 may identify a beam-specific parameter indicating a maximum transmit power for the directional uplink beam based on receiving the beam-specific report, identify a second beam-specific parameter for a second directional uplink beam of the UE based on receiving the beam-specific report, where the beam-specific report received using the directional uplink beam includes the second beam-specific parameter for the second directional uplink beam, identify a maximum transmit power for the second directional uplink beam based on the beam-specific report, where the second beam-specific parameter indicates the maximum transmit power for the second directional uplink beam, identify the second beam specific parameter for the third directional uplink beam based on the second beam-specific report, where determining the one or more uplink communication resources is based on the second beam specific parameter for the third directional uplink beam, and identify a second beam-specific parameter for the directional uplink beam, the second beam-specific parameter indicating a difference between the maximum transmit power and an estimated transmit power for the directional uplink beam, where the beam-specific report includes the second beam-specific parameter. In some cases, the second beam-specific report is transmitted using a MAC CE carried on a PUSCH or UCI carried on a PUCCH or a combination thereof. In some cases, the beam-specific report is transmitted using a MAC CE carried on a PUSCH on the first directional uplink beam or UCI carried on a PUCCH on the first direction uplink beam or a combination thereof. In some cases, the beam-specific parameter is a $P_{CMAX}$ parameter. In some cases, the second beam-specific parameter is a power headroom parameter.

The resource manager 1230 may determine one or more uplink communication resources for the UE based on the beam-specific parameter.

The power headroom manager 1235 may identify a difference between a maximum transmit power and an estimated transmit power for the second directional uplink beam based on the beam-specific report, where the second beam-specific parameter indicates the difference for the second direction transmission beam.

The report manager 1240 may receive a second beam-specific report using the directional uplink beam or a second directional uplink beam that includes a second beam-specific parameter for a third directional uplink beam. In some cases, the beam-specific report is a power headroom report that includes power information for a set of directional uplink beams associated with the UE.

Figure 13:
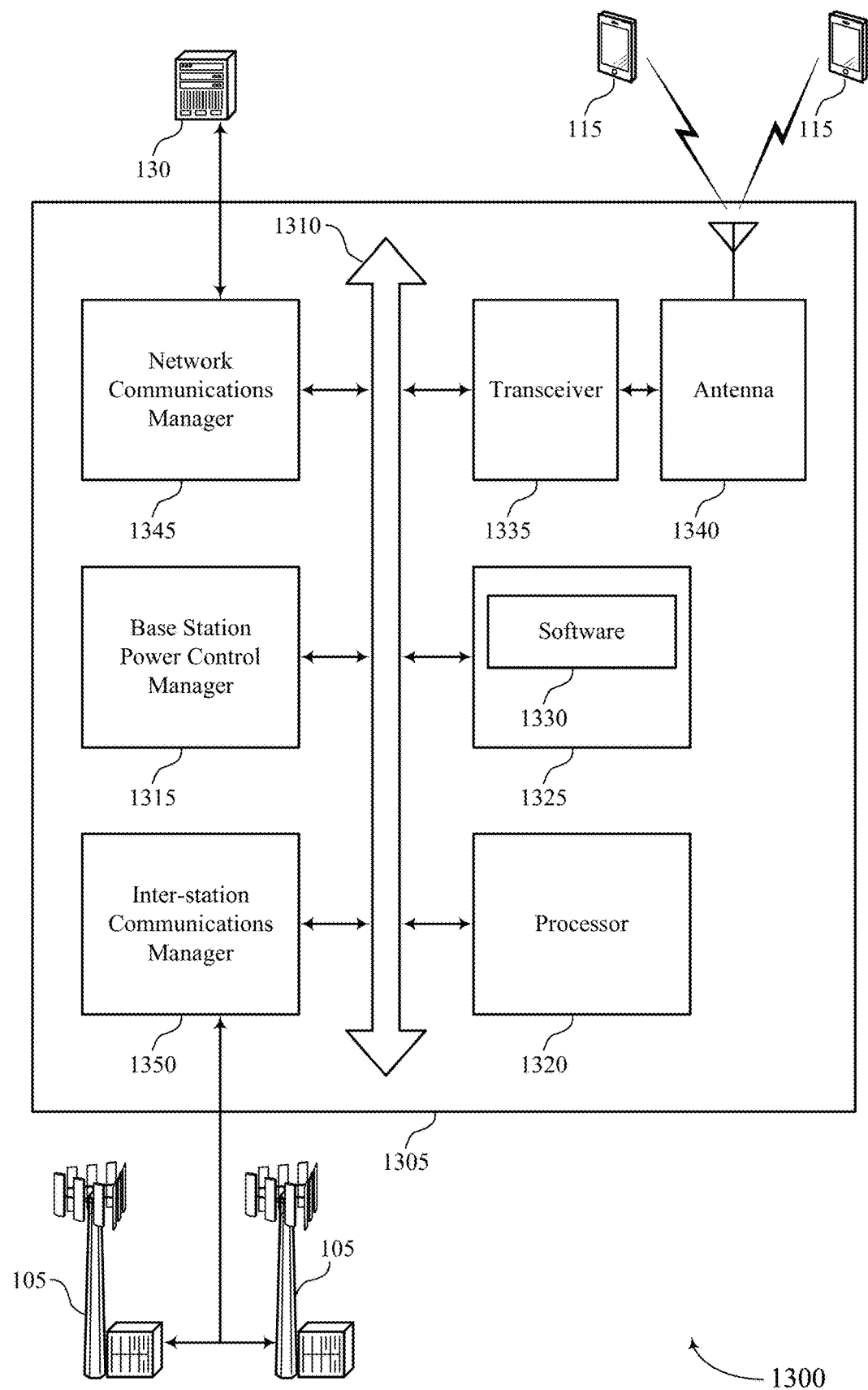
FIG. 13 illustrates a block diagram of a system including a base station that supports power control in directional beam environments in accordance with aspects of the present disclosure.

FIG. 13 shows a diagram of a system 1300 including a device 1305 that supports power control in directional beam environments in accordance with aspects of the present disclosure. The device 1305 may be an example of or include the components of base station 105 as described above, e.g., with reference to FIG. 1. The device 1305 may include components for bi-directional voice and data communications including components for transmitting and receiving communications, including a base station power control manager 1315, a processor 1320, memory 1325, software 1330, a transceiver 1335, an antenna 1340, a network communications manager 1345, and an inter-station communications manager 1350. These components may be in electronic communication via one or more buses (e.g., a bus 1310). The device 1305 may communicate wirelessly with one or more UEs 115.

The processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1320 may be configured to operate a memory array using a memory controller. In other cases, a memory controller may be integrated into the processor 1320. The processor 1320 may be configured to execute computer-readable instructions stored in a memory to perform various functions (e.g., functions or tasks supporting power control in directional beam environments).

The memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

The software 1330 may include code to implement aspects of the present disclosure, including code to support power control in directional beam environments. The software 1330 may be stored in a non-transitory computer-readable medium such as system memory or other memory. In some cases, the software 1330 may not be directly executable by the processor but may cause a computer (e.g., when compiled and executed) to perform functions described herein.

The transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device 1305 may include a single antenna 1340. However, in some cases the device 1305 may have more than one antenna 1340, which may be capable of concurrently transmitting or receiving multiple wireless transmissions.

The network communications manager 1345 may manage communications with the core network (e.g., via one or more wired backhaul links). For example, the network communications manager 1345 may manage the transfer of data communications for client devices, such as one or more UEs 115.

The inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, the inter-station communications manager 1350 may provide an X2 interface within an LTE/LTE-A wireless communication network technology to provide communication between base stations 105.

Figure 14:
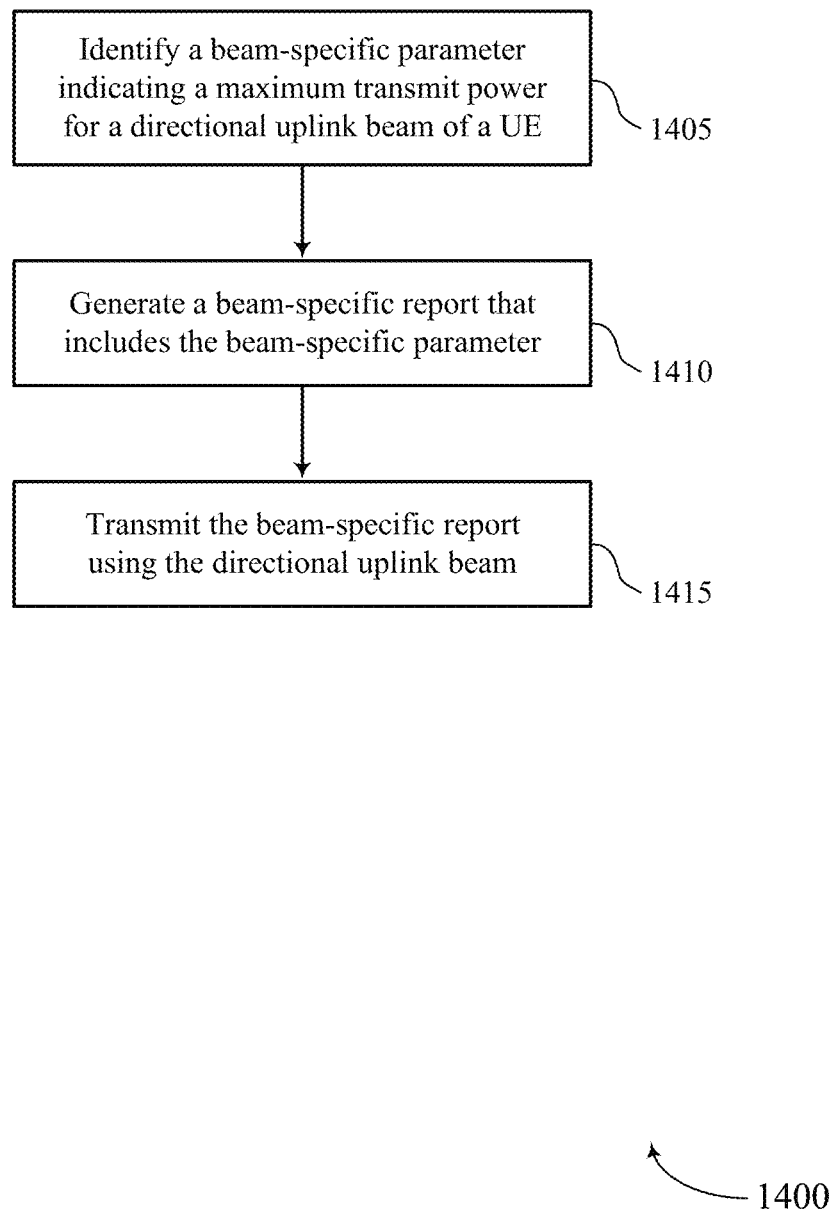
FIGS. 14 through 15 illustrate methods for power control in directional beam environments in accordance with aspects of the present disclosure.

FIG. 14 shows a flowchart illustrating a method 1400 for power control in directional beam environments in accordance with aspects of the present disclosure. The operations of method 1400 may be implemented by a UE 115 or its components as described herein. For example, the operations of method 1400 may be performed by a UE power control manager as described with reference to FIGS. 6 through 9. In some examples, a UE 115 may execute a set of codes to control the functional elements of the device to perform the functions described below. Additionally, or alternatively, the UE 115 may perform aspects of the functions described below using special-purpose hardware.

At 1405, the UE 115 may identify a beam-specific parameter indicating a maximum transmit power for a directional uplink beam of a UE. The operations of 1405 may be performed according to the methods described herein. In certain examples, aspects of the operations of 1405 may be performed by a parameter manager as described with reference to FIGS. 6 through 9.

At 1410, the UE 115 may generate a beam-specific report that includes the beam-specific parameter. The operations of 1410 may be performed according to the methods described herein. In certain examples, aspects of the operations of 1410 may be performed by a report manager as described with reference to FIGS. 6 through 9.

At 1415, the UE 115 may transmit the beam-specific report using the directional uplink beam. The operations of 1415 may be performed according to the methods described herein. In certain examples, aspects of the operations of 1415 may be performed by a directional link manager as described with reference to FIGS. 6 through 9.

Figure 15:
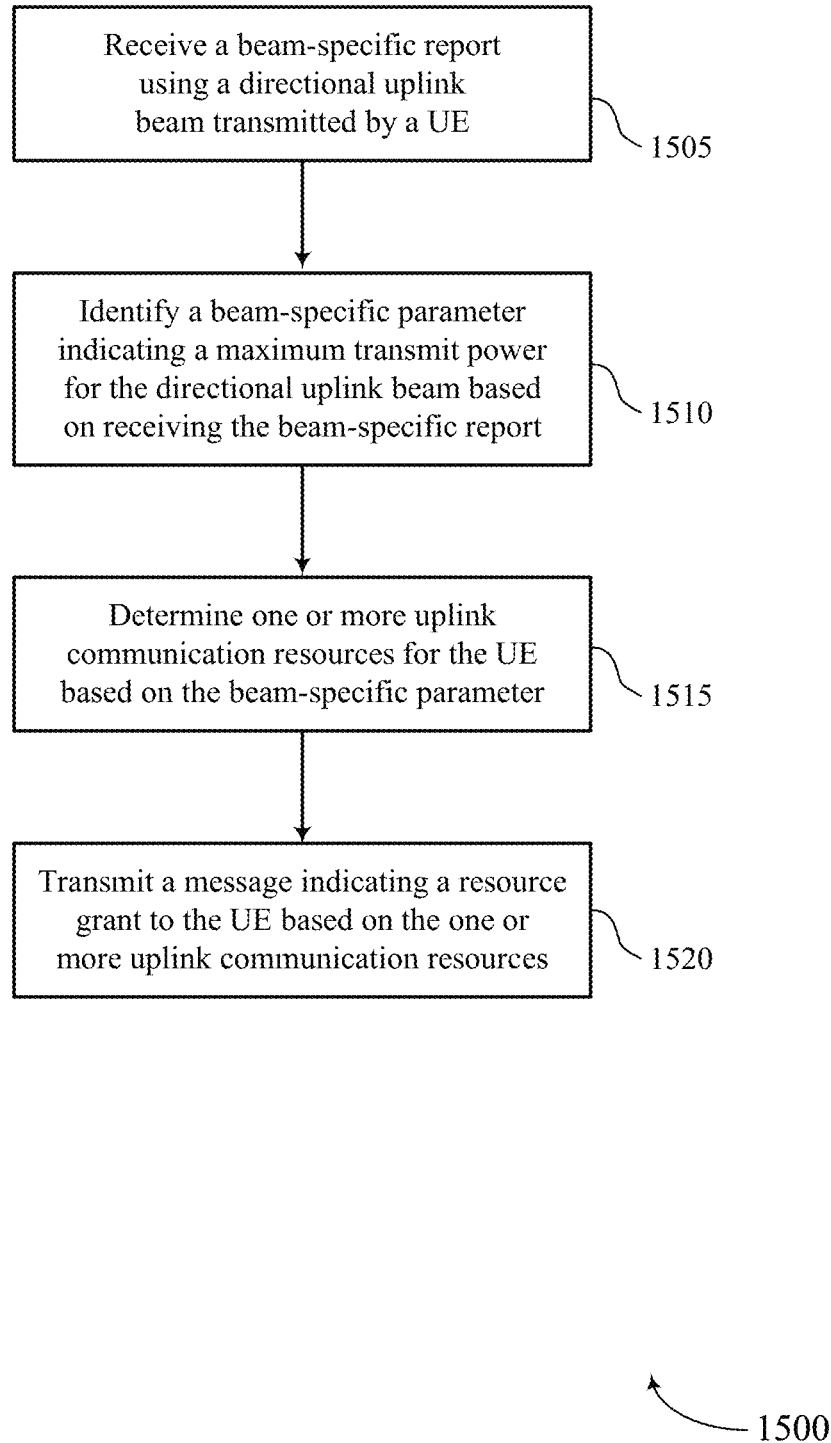

FIG. 15 shows a flowchart illustrating a method 1500 for power control in directional beam environments in accordance with aspects of the present disclosure. The operations of method 1500 may be implemented by a base station 105 or its components as described herein. For example, the operations of method 1500 may be performed by a base station power control manager as described with reference to FIGS. 10 through 13. In some examples, a base station 105 may execute a set of codes to control the functional elements of the device to perform the functions described below. Additionally, or alternatively, the base station 105 may perform aspects of the functions described below using special-purpose hardware.

At 1505, the base station 105 may receive a beam-specific report using a directional uplink beam transmitted by a UE. The operations of 1505 may be performed according to the methods described herein. In certain examples, aspects of the operations of 1505 may be performed by a directional link manager as described with reference to FIGS. 10 through 13.

At 1510, the base station 105 may identify a beam-specific parameter indicating a maximum transmit power for the directional uplink beam based at least in part on receiving the beam-specific report. The operations of 1510 may be performed according to the methods described herein. In certain examples, aspects of the operations of 1510 may be performed by a parameter manager as described with reference to FIGS. 10 through 13.

At 1515, the base station 105 may determine one or more uplink communication resources for the UE based at least in part on the beam-specific parameter. The operations of 1515 may be performed according to the methods described herein. In certain examples, aspects of the operations of 1515 may be performed by a resource manager as described with reference to FIGS. 10 through 13.

At 1520, the base station 105 may transmit a message indicating a resource grant to the UE based at least in part on the one or more uplink communication resources. The operations of 1520 may be performed according to the methods described herein. In certain examples, aspects of the operations of 1520 may be performed by a directional link manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on".

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a beam-specific parameter indicating a maximum transmit power for a directional uplink beam of a user equipment (UE);
   identifying a trigger event associated with the directional uplink beam, wherein the trigger event comprises a determination that a beam-specific timer for the directional uplink beam has expired;
   generating a beam-specific report that includes the beam-specific parameter indicating the maximum transmit power for the directional uplink beam based at least in part on identifying the trigger event; and
   transmitting the beam-specific report using the directional uplink beam.

2. The method of claim 1, further comprising:
   identifying a second beam-specific parameter for a second directional uplink beam of the UE; and
   transmitting the beam-specific report with the second beam-specific parameter and the beam-specific parameter using the directional uplink beam.

3. The method of claim 2, further comprising:
   identifying a maximum transmit power for the second directional uplink beam, wherein the second beam-specific parameter indicates the identified maximum transmit power for the second directional uplink beam.

4. The method of claim 2, further comprising:
   identifying a difference between a maximum transmit power for the second directional uplink beam and an estimated transmit power for the second directional uplink beam, wherein the second beam-specific parameter indicates the identified difference.

5. The method of claim 2, further comprising:
   generating a bit-map that associates a first set of data elements of the beam-specific report with the beam-specific parameter and a second set of data elements of the beam-specific report with the second beam-specific parameter.

6. The method of claim 2, further comprising:
   estimating an amount of traffic for the second directional uplink beam, wherein the second beam-specific parameter indicates a power need of the second directional uplink beam based at least in part on the estimated amount of traffic.

7. The method of claim 1, further comprising:
   generating a second beam-specific report that includes a second beam-specific parameter for a second directional uplink beam; and transmitting the second beam-specific report using the directional uplink beam or the second directional uplink beam.

8. The method of claim 7, wherein the second beam-specific report is transmitted using a medium access control (MAC) control element (CE) carried on a physical uplink shared channel (PUSCH) or uplink control information (UCI) carried on a physical uplink control channel (PUCCH) or a combination thereof.

9. The method of claim 1, wherein the beam-specific report is transmitted using a medium access control (MAC) control element (CE) carried on a physical uplink shared channel (PUSCH) on the first directional uplink beam or uplink control information (UCI) carried on a physical uplink control channel (PUCCH) on the first direction uplink beam or a combination thereof.

10. The method of claim 1, wherein the trigger event further comprises at least one of an establishment of a second directional uplink beam with a base station, or a determination that a signal quality parameter associated with the directional uplink beam satisfies a threshold, or a combination thereof.

11. The method of claim 1, further comprising:
identifying a second beam-specific parameter for the directional uplink beam, the second beam-specific parameter indicating a difference between the maximum transmit power and an estimated transmit power for the directional uplink beam, wherein the beam-specific report includes the second beam-specific parameter.

12. The method of claim 11, wherein:
the beam-specific parameter is a PCMAX parameter; and
the second beam-specific parameter is a power headroom parameter.

13. The method of claim 1, wherein the beam-specific report is a power headroom report that includes power information for a plurality of directional uplink beams associated with the UE.

14. The method of claim 1, wherein the beam-specific report further includes one or more additional power parameters for each additional directional uplink transmission beam of the UE.

15. The method of claim 1, wherein the trigger event further comprises receipt of a message requesting receipt of the beam-specific report.

16. An apparatus for wireless communication, comprising:
a processor;
memory coupled to the processor; and
instructions stored in the memory and executable by the processor to cause the apparatus to:
identify a beam-specific parameter indicating a maximum transmit power for a directional uplink beam of a user equipment (UE);
identify a trigger event associated with the directional uplink beam, wherein the trigger event comprises a determination that a beam-specific timer for the directional uplink beam has expired;
generate a beam-specific report that includes the beam-specific parameter indicating the maximum transmit power for the directional uplink beam based at least in part on identifying the trigger event; and
transmit the beam-specific report using the directional uplink beam.

17. The apparatus of claim 16, wherein the instructions are further executable by the processor to cause the apparatus to:
identify a second beam-specific parameter for a second directional uplink beam of the UE; and
transmit the beam-specific report with the second beam-specific parameter and the beam-specific parameter using the directional uplink beam.

18. The apparatus of claim 17, further comprising:
estimating an amount of traffic for the second directional uplink beam, wherein the second beam-specific parameter indicates a power need of the second directional uplink beam based at least in part on the estimated amount of traffic.

19. The apparatus of claim 16, wherein the beam-specific report further includes one or more additional power parameters for each additional directional uplink transmission beam of the UE.

20. The apparatus of claim 16, wherein the trigger event further comprises receipt of a message requesting receipt of the beam-specific report.

21. The apparatus of claim 20, wherein:
the beam-specific parameter is a PCMAX parameter; and
the second beam-specific parameter is a power headroom parameter.

22. The apparatus of claim 16, wherein the trigger event further comprises at least one of an establishment of a second directional uplink beam with a base station, or a determination that a signal quality parameter associated with the directional uplink beam satisfies a threshold, or a combination thereof.

23. The apparatus of claim 16, wherein the instructions are further executable by the processor to cause the apparatus to:
identify a second beam-specific parameter for the directional uplink beam, the second beam-specific parameter indicating a difference between the maximum transmit power and an estimated transmit power for the directional uplink beam, wherein the beam-specific report includes the second beam-specific parameter.

24. The apparatus of claim 16, wherein the beam-specific report is a power headroom report that includes power information for a plurality of directional uplink beams associated with the UE.

* * * * *